(12) United States Patent
Shimura

(10) Patent No.: US 12,051,917 B2
(45) Date of Patent: Jul. 30, 2024

(54) POWER TRANSMITTING APPARATUS, POWER RECEIVING APPARATUS, METHOD THEREFOR, AND STORAGE MEDIUM

(71) Applicant: CANON KABUSHIKI KAISHA, Tokyo (JP)

(72) Inventor: Hajime Shimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 17/887,351

(22) Filed: Aug. 12, 2022

(65) Prior Publication Data

US 2022/0393516 A1 Dec. 8, 2022

Related U.S. Application Data

(63) Continuation of application No. PCT/JP2021/004638, filed on Feb. 8, 2021.

(30) Foreign Application Priority Data

Feb. 14, 2020 (JP) ................. 2020-023665

(51) Int. Cl.
*H02J 50/60* (2016.01)
*H02J 50/10* (2016.01)
*H02J 50/80* (2016.01)

(52) U.S. Cl.
CPC .............. *H02J 50/60* (2016.02); *H02J 50/10* (2016.02); *H02J 50/80* (2016.02)

(58) Field of Classification Search
CPC .............. H02J 50/10; H02J 50/60; H02J 50/80
USPC ........................................................ 307/104
See application file for complete search history.

(56) References Cited

U.S. PATENT DOCUMENTS

| 10,110,066 B2 * | 10/2018 | Watanabe | ............... H02J 50/10 |
| 10,114,396 B2 * | 10/2018 | Tsai | ........................ G05F 1/66 |
| 10,199,866 B2 * | 2/2019 | Uchimoto | ........... H04B 5/0093 |
| 10,848,011 B2 * | 11/2020 | Jung | ...................... H02J 50/12 |

FOREIGN PATENT DOCUMENTS

| JP | 2012-249406 A | 12/2012 |
| JP | 2014-161217 A | 9/2014 |
| JP | 2015-027172 A | 2/2015 |
| JP | 2015-056959 A | 3/2015 |
| JP | 2016-096724 A | 5/2016 |
| JP | 2017-070074 A | 4/2017 |

* cited by examiner

*Primary Examiner* — Hal Kaplan
(74) *Attorney, Agent, or Firm* — Canon U.S.A., Inc. I.P. Division

(57) ABSTRACT

A power transmitting apparatus measures a waveform attenuation rate of a transmission power waveform, at a transmission antenna, in a state in which the power transmission by the power transmitting is restricted, sets a threshold used for detecting a foreign object between the power transmitting apparatus and the power receiving apparatus on the basis of the measured waveform attenuation rate, and determines whether or not the foreign object is present on the basis of the waveform attenuation rate measure after the threshold is set and the threshold.

13 Claims, 12 Drawing Sheets

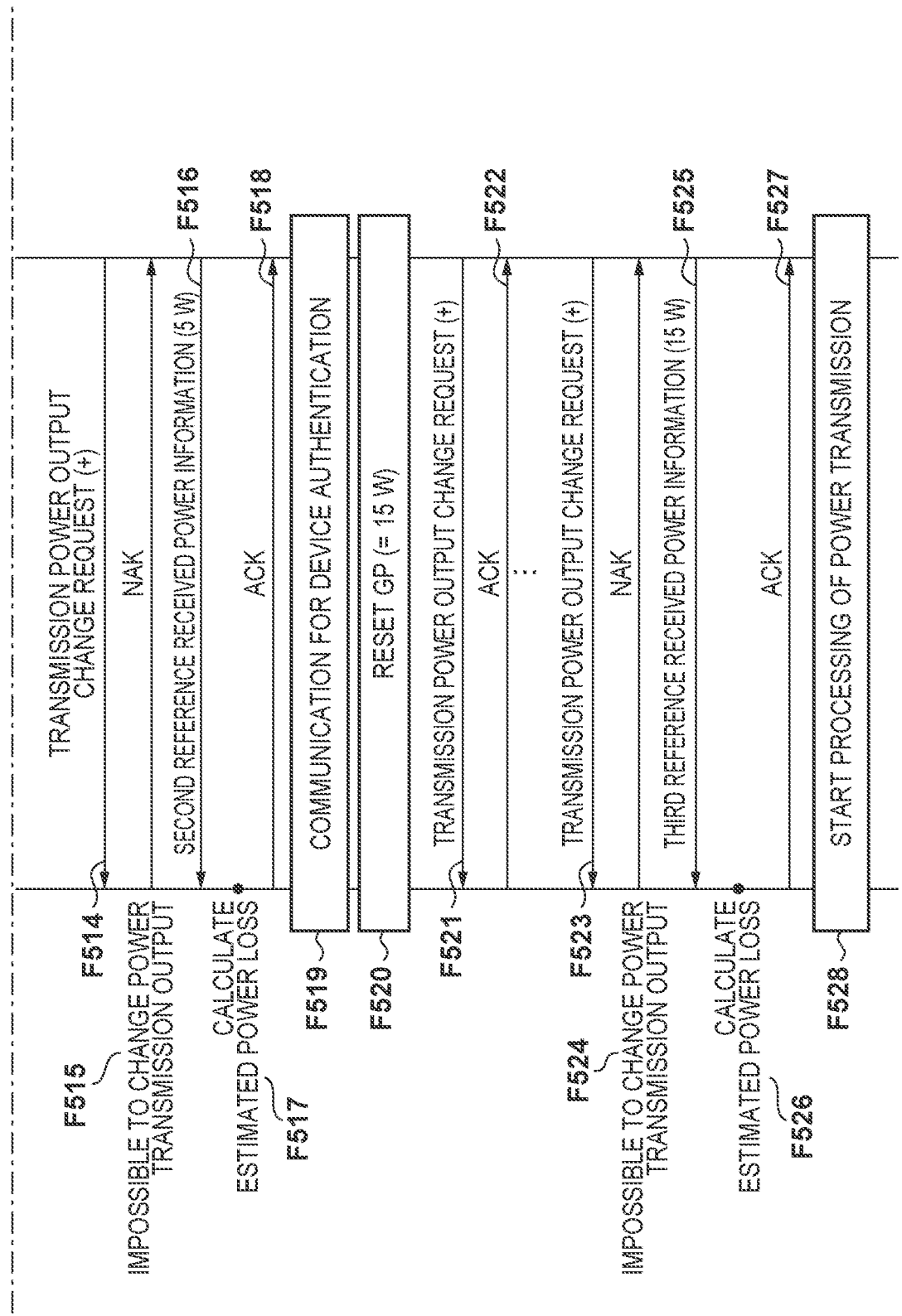

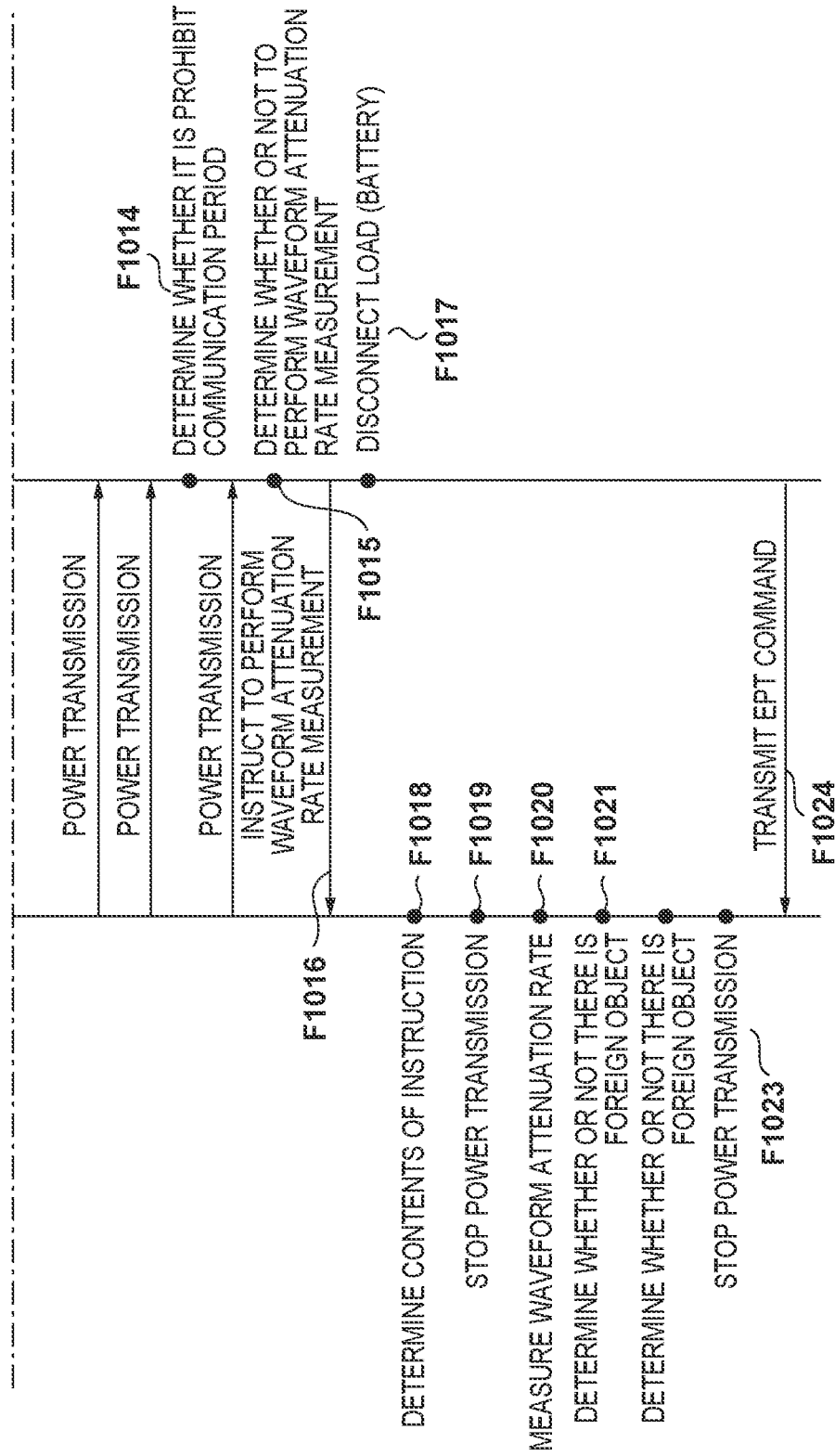

POWER TRANSMITTING APPARATUS, POWER RECEIVING APPARATUS, METHOD THEREFOR, AND STORAGE MEDIUM

CROSS-REFERENCE TO RELATED APPLICATIONS

This application is a Continuation of International Patent Application No. PCT/JP2021/004638, filed Feb. 8, 2021, which claims the benefit of Japanese Patent Application No. 2020-023665, filed Feb. 14, 2020, both of which are hereby incorporated by reference herein in their entirety.

BACKGROUND

Field

The present disclosure relates to wireless power transmission technology.

Background Art

Development of technology relating to wireless power transmission systems has been carried out extensively in recent years. A power transmitting apparatus and a power receiving apparatus compliant with the Wireless Power Consortium (WPC) standard developed by the WPC, a group for promoting wireless charging standards, are described in PTL 1. Also, a method for foreign object detection relating to the WPC standard is described in PTL 2. In PTL 3, a foreign object detection method is described in which a power transmitting apparatus transmits a foreign object detection signal to a power receiving apparatus and determines whether or not there is a foreign object using an echo signal from the power receiving apparatus.

In the foreign object detection method described in PTL 3, a foreign object detection signal for detecting a foreign object must be transmitted. Thus, a circuit for transmitting a foreign object detection signal must be added and time is needed for transmitting a foreign object detection signal. This leads to a problematic increase in cost and a decrease in transmission efficiency.

CITATION LIST

Patent Literature

PTL 1: Japanese Patent Laid-Open No. 2015-56959
PTL 2: Japanese Patent Laid-Open No. 2017-70074
PTL 3: Japanese Patent Laid-Open No. 2015-27172

SUMMARY

In light of the problems described above, the present disclosure provides a more appropriate foreign object detection technology.

According to one aspect of the present disclosure, there is provided a power transmitting apparatus comprising: a power transmitting unit configured to wirelessly transmit power to a power receiving apparatus via a power transmitting antenna; a control unit configured to control the power transmission by the power transmitting unit; a measuring unit configured to measure a waveform attenuation rate of a transmission power waveform in a state in which the power transmission by the power transmitting unit is restricted; a setting unit configured to set a threshold used for detecting a foreign object on the basis of the measured waveform attenuation rate; and a determining unit configured to determine, after the threshold is set by the setting unit, whether or not the foreign object is present on the basis of the waveform attenuation rate measured by the measuring unit and the threshold.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description, serve to explain principles of the present disclosure.

FIG. 5B is a sequence diagram for power transmission according to the WPC standard.

FIG. 10B is a sequence diagram of the power transmitting apparatus and the power receiving apparatus according to some embodiments.

DESCRIPTION OF THE EMBODIMENTS

Figure 1:
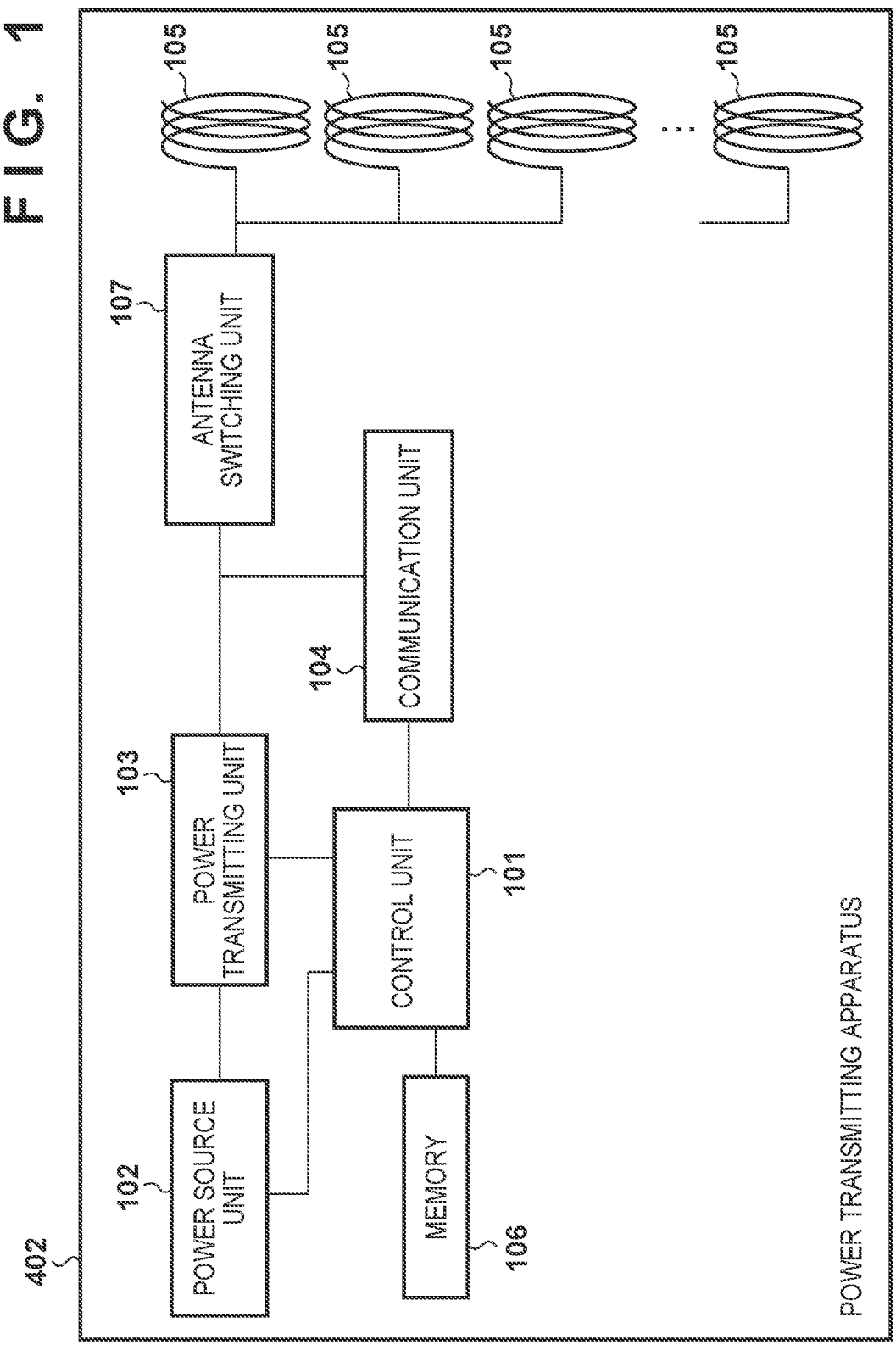
FIG. 1 is a block diagram illustrating an example configuration of a power transmitting apparatus.

Hereinafter, embodiments will be described in detail with reference to the attached drawings. Note, the following embodiments are not intended to limit the scope of the present disclosure. Multiple features are described in the embodiments, but limitation is not made to the disclosure that requires all such features, and multiple such features may be combined as appropriate. Furthermore, in the attached drawings, the same reference numerals are given to the same or similar configurations, and redundant description thereof is omitted.

First Embodiment

Wireless Power Transmission System Configuration

Figure 4:
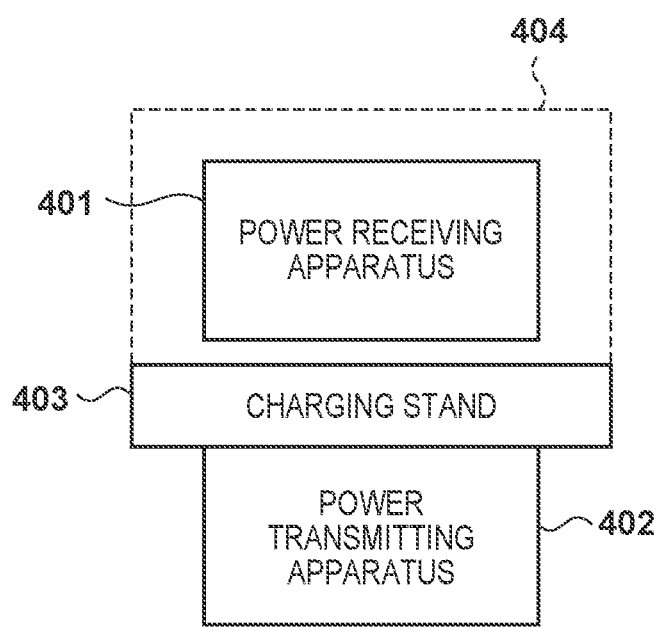
FIG. 4 is a diagram illustrating an example configuration of a wireless power transmission system.

FIG. 4 is a diagram illustrating an example of the configuration of a wireless power transmission system (wireless charging system) according to the present embodiment. The present system includes a power receiving apparatus 401 and a power transmitting apparatus 402, for example. Hereinafter, the power receiving apparatus 401 will be referred to as RX, and the power transmitting apparatus 402 will be referred to as TX. The RX is an electronic device that receives power from the TX and charges a built-in battery. The TX is an electronic device that wirelessly transmits power to the RX placed on a charging stand 403, which is a part of the TX. Hereinafter, because the charging stand 403 is a part of the TX, the wording "placed on the TX (power transmitting apparatus 402)" may be used to mean "placed on the charging stand 403". An area 404 surrounded by the broken line is the area in which the RX can receive power from the TX. Note that the RX and the TX may have a function of executing an application other than wireless charging. An example of the RX is a smartphone, and an example of the TX is an accessory device for charging the smartphone. The RX and the TX may be tablets, storage apparatuses, such as a hard disk device or a memory device, or may be information processing apparatuses, such as a personal computer (PC) or the like. Also, the RX and the TX may be an image capturing apparatus (a camera, a video camera, or the like), for example.

In the present system, wireless power transmission is performed using an electromagnetic induction method for wireless charging on the basis of the Wireless Power Consortium (WPC) standard. In other words, for the RX and the TX, wireless power transmission is performed between a power receiving antenna of the RX and a power transmitting antenna of the TX to perform a wireless charge based on the WPC standard. Note that the wireless power transmission system used in the present system is not limited to that defined in the WPC standard, and other systems may be used, such as other electromagnetic induction systems, magnetic field resonance systems, electric field resonance systems, microwave systems, lasers, and the like. Also, in the present embodiment, the wireless charging uses wireless power transmission. However, wireless power transmission may be used for a different purpose other than for wireless charging.

In the WPC standard, the magnitude of the power guaranteed when power is received by the power receiving apparatus from the power transmitting apparatus is defined as a value called guaranteed power (hereinafter, referred to as GP). GP indicates the power value of the guaranteed output to the load (for example, a circuit for charging, a battery, or the like) of the power receiving apparatus even when the power transmitting efficiency between the power receiving antenna and the power transmitting antenna decreases due to the positional relationship between the power receiving apparatus and the power transmitting apparatus changing, for example. For example, in a case where the GP is 5 watts, even when the positional relationship between the power receiving antenna and the power transmitting antenna changes and the power transmitting efficiency is reduced, the power transmitting apparatus controls the power transmission in a manner such that 5 watts is output to the load in the power receiving apparatus.

Also, in the WPC standard, the method by which the power transmitting apparatus detects whether an object (foreign object) that is not the power receiving apparatus is present near the power transmitting apparatus (near the power transmitting antenna) is specified. The methods specifically specified are a power loss method in which a foreign object is detected using the difference between the transmitted power of the power transmitting apparatus and the received power of the power receiving apparatus and a Q-factor measurement method in which a foreign object is detected using the change in the quality coefficient (Q-factor) of the power transmitting antenna (power transmitting coil) of the power transmitting apparatus. Foreign object detection using the power loss method is performed during (in a power transfer phase described below) power transmission (transmitting power) on the basis of data obtained in a calibration phase described below. Also, foreign object detection using the Q-factor measurement method is performed before power transmission (before transmitting a digital ping as described below, in a negotiation phase or in a renegotiation phase).

The RX and the TX according to the present embodiment communicate to perform power transmission and reception control based on the WPC standard. The WPC standard defines a plurality of phases including a power transfer phase in which power is transmitted and one or more phases before actual power transmission. In these phases, communication is executed to control the transmitting and receiving of power as necessary. Pre-power transmission phases may include a selection phase, a ping phase, an identification and configuration phase, a negotiation phase, and a calibration phase. Note that hereinafter, the identification and configuration phase will be referred to as the I&C phase. The processing in each phase will be described below.

In the selection phase, the TX intermittently transmits an analog ping and detects if an object is placed on the charging stand (for example, if the RX, conductor piece, or the like is placed on the charging stand) of the TX. The TX detects at least a voltage value or a current value of a power transmitting antenna when the analog ping is transmitted, determines that an object is present in the case where the voltage value is less than a threshold or the current value is greater than a threshold, and transitions to the ping phase.

In the ping phase, the TX transmits a digital ping with more power than the analog ping. The magnitude of power of the digital ping is sufficient enough to activate a control unit of the RX placed on the TX. The RX notifies the TX of the magnitude of the received voltage. In this manner, by receiving a reply from the RX that received the digital ping, the TX recognizes that the object detected in the selection phase is the RX. When the TX receives a notification of the received voltage value, the process transitions to the I&C phase. Also, before the TX transmits a digital ping, the TX measures the Q-factor of the power transmitting antenna (power transmitting coil). The measurement result is used when executing foreign object detection processing using a Q-factor measurement method.

In the I&C phase, the TX identifies the RX and acquires device configuration information (capability information) from the RX. Accordingly, the RX transmits an ID packet and a configuration packet. The ID packet includes the identifier information of the RX, and the configuration packet includes the device configuration information (capability information) of the RX. The TX having received the ID packet and the configuration packet replies with an acknowledgement (ACK, affirmative reply). Then, the I&C phase ends.

In the negotiation phase, the GP value is determined on the basis of the GP value requested by the RX, the power transmission ability of the TX, and the like. Also, the TX executes foreign object detection processing using the Q-factor measurement method in accordance with the request from the RX. Also, in the WPC standard, a method is specified in which, after the power transfer phase has been transitioned to, a similar processing to the negotiation phase is again executed at the request of the RX. The phase in which this processing is executed after transitioning from the power transfer phase is called the renegotiation phase.

In the calibration phase, calibration is performed on the basis of the WPC standard. Also, the RX notifies the TX of a predetermined received power value (received power value in a light load state/received power value in a maximum load state), and the TX performs adjustment so that power is efficiently transmitted. The received power value communicated to the TX can be used for foreign object detection processing using the power loss method.

In the power transfer phase, control is performed to start power transmission, continue power transmission, stop power transmission due to an error or a full charge, and the like. The TX and the RX perform communication using the same power transmitting antenna (power transmitting coil) used for wireless power transmission based on the WPC standard, for controlling the transmitting and receiving of power there between and superimposing a signal on the electromagnetic waves transmitted from the power transmitting antenna or the power receiving antenna. Note that the communicable range between the TX and the RX based on the WPC standard is roughly the same as the power-transmittal range of the TX.

Configuration of Power Transmitting Apparatus and Power Receiving Apparatus

Next, the configuration of the power transmitting apparatus 402 (TX) and the power receiving apparatus 401 (RX) according to the present embodiment will be described. Note that the configuration described below is simply one example, and a part (or all parts) of the configuration described below may be replaced by other configurations with similar functions, may be omitted, or other configurations may be added in addition to the configurations described below. Furthermore, one block described in the description below may be one block divided into a plurality of blocks or may be a plurality of blocks merged as a single block. Also, for the functional blocks described below, the functions may be configured as software programs. However, a part or all parts included in each functional block may be configured as hardware.

FIG. 1 is a functional block diagram illustrating an example of the configuration of the power transmitting apparatus 402 (TX) according to the present embodiment. The TX includes a control unit 101, a power source unit 102, a power transmitting unit 103, a communication unit 104, a power transmitting antenna 105, a memory 106, and an antenna switching unit 107. The control unit 101, the power source unit 102, the power transmitting unit 103, the communication unit 104, the memory 106, and the antenna switching unit 107 are illustrated as separate units in FIG. 1. However, from among these, any number of the functional blocks may be mounted on the same chip.

The control unit 101, for example, controls the entire TX by executing a control program stored in the memory 106. Also, the control unit 101 executes control relating to power transmission control including communication for device authentication by the TX. Furthermore, the control unit 101 may execute control for executing an application other than wireless power transmission. The control unit 101, for example, includes one or more processors, such as a central processing unit (CPU), a microprocessing unit (MPU), or the like. Note that the control unit 101 may be configured as hardware such as an application specific integrated circuit (ASIC) or the like. Also, the control unit 101 may include an array circuit such as a field programmable gate array (FPGA) compiled so as to execute predetermined processing. The control unit 101 causes information stored during the execution of various types of processing to be stored in the memory 106. Also, the control unit 101 is capable of measuring time using a timer (not illustrated).

The power source unit 102 supplies power to each functional block. The power source unit 102, for example, is a commercial power source or a battery. Power supplied from a commercial power source is stored in the battery.

The power transmitting unit 103 converts direct current or alternating current power input from the power source unit 102 to alternating current frequency power in a frequency band used for wireless power transmission and generates electromagnetic waves for reception by the RX by inputting the alternating current frequency power into the power transmitting antenna 105. For example, the power transmitting unit 103 converts DC voltage supplied by the power source unit 102 to AC voltage at a switching circuit with a half bridge or full bridge configuration using FETs. In this case, the power transmitting unit 103 includes a gate driver that controls switching the FETs on and off.

Also, the power transmitting unit 103 controls the intensity of the electromagnetic waves output by adjusting either one or both of the voltage (power transmission voltage) and the current (power transmission current) input to the power transmitting antenna 105. If power transmission voltage or power transmission current is increased, the intensity of electromagnetic waves is increased, and if power transmission voltage or power transmission current is decreased, the intensity of electromagnetic waves is decreased. In addition, on the basis of an instruction from the control unit 101, the power transmitting unit 103 performs output control of the alternating current frequency power to start or stop power transmission from the power transmitting antenna 105. Also, the power transmitting unit 103 has the ability to supply power corresponding to outputting 15 watts (W) of power to a charge unit 206 (FIG. 2) of the power receiving apparatus 401 (RX) according to the WPC standard.

The communication unit 104 performs communication with the RX for power transmission control based on the WPC standard as described above. The communication unit 104 performs communication including modulating the electromagnetic waves output from the power transmitting antenna 105 and transmitting information to the RX. Also, the communication unit 104 demodulates the electromagnetic waves modulated by the RX and transmitted from the power transmitting antenna 105 and obtains the information transmitted by the RX. In other words, communication performed by the communication unit 104 is performed by superimposition of a signal on electromagnetic waves transmitted from the power transmitting antenna 105. Also, the communication unit 104 may communicate with the RX via communication using a standard other than the WPC standard using an antenna other than the power transmitting antenna 105, or the communication unit 104 may communicate with the RX selectively using a plurality of communications.

The memory 106 may store the control program as well as the state of the TX and the RX (transmission power value, received power value, and the like). For example, the state of the TX may be obtained by the control unit 101, the state of the RX may be obtained by a control unit 201 (FIG. 2) of the RX, and these may be received via the communication unit 104.

The power transmitting antenna 105 includes a plurality of antennas (coils). The antenna switching unit 107 selects and switches to one from among the plurality of antennas (coils). Alternatively, the power transmitting antenna 105 may be a single antenna and not include a plurality of antennas. In this case, the antenna switching unit 107 is not required.

Figure 2:
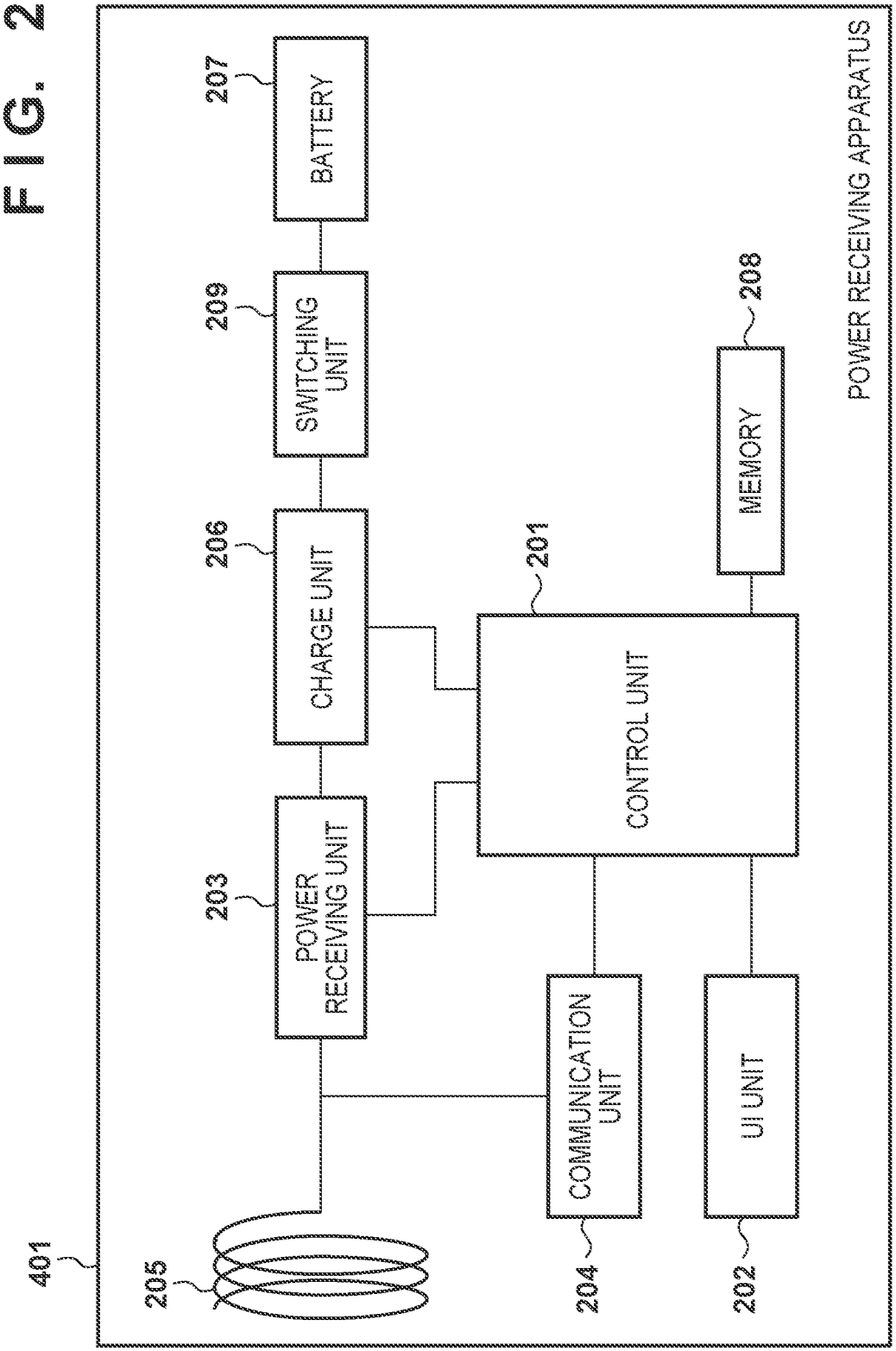
FIG. 2 is a block diagram illustrating an example configuration of a power receiving apparatus.

FIG. 2 is a block diagram illustrating an example of the configuration of the power receiving apparatus 401 (RX) according to the present embodiment. The RX includes the control unit 201, a user interface (UI) unit 202, a power receiving unit 203, a communication unit 204, a power receiving antenna 205, the charge unit 206, a battery 207, a memory 208, and a switching unit 209. Note that the plurality of functional blocks illustrated in FIG. 2 may be implemented as a single hardware module.

The control unit 201, for example, controls the entire RX by executing a control program stored in the memory 208. In other words, the control unit 201 controls the functional units illustrated in FIG. 2. Furthermore, the control unit 201 may execute control for executing an application other than wireless power transmission. In one example, the control unit 201 includes one or more processors, such as a CPU, an MPU, or the like. Note that the entire RX (in a case where the RX is a smart phone, the entire smart phone) may be controlled in cooperation with the operating system (OS) executed by the control unit 201.

Also, the control unit 201 may be configured as hardware such as an ASIC. Also, the control unit 201 may include an array circuit such as an FPGA compiled so as to execute predetermined processing. The control unit 201 causes information stored during the execution of various types of processing to be stored in the memory 208. Also, the control unit 201 is capable of measuring time using a timer (not illustrated).

The UI unit 202 performs various types of output to the user. Herein, outputting in various manners refers to an operation such as screen display, flashing or changing the color of light-emitting diodes (LED), audio output via a speaker, vibration of the RX body, and the like. The UI unit 202 is implemented by a liquid crystal panel, a speaker, a vibration motor, or the like.

The power receiving unit 203, at the power receiving antenna 205, obtains AC power (AC voltage and AC current) generated by electromagnetic induction caused by electromagnetic waves emitted from the power transmitting antenna 105 of the TX 402. Also, the power receiving unit 203 converts the AC power to DC or AC power of a predetermined frequency and outputs the power to the charge unit 206 that executes processing to charge the battery 207. In other words, the power receiving unit 203 supplies power to a load in the RX. GP as described above is the amount of power guaranteed to be output from the power receiving unit 203. The power receiving unit 203 is capable of supplying power for the charge unit 206 to charge the battery 207 and supplying power corresponding to outputting 15 watts to the charge unit 206.

The switching unit 209 is configured to control whether or not the received power is supplied to the battery (load). The switching unit 209 also has the function of controlling the value of the load. By connecting the charge unit 206 and the battery 207 via the switching unit 209, the received power is supplied to the battery 207. By disconnecting the connection between the charge unit 206 and the battery 207 via a switch and the switching unit 209, the received power is not supplied to the battery 207. Note that, as illustrated in FIG. 2, the switching unit 209 is disposed between the charge unit 206 and the battery 207, but may be disposed between the power receiving unit 203 and the charge unit 206. In FIG. 2, the switching unit 209 illustrated as a single block. However, alternatively, the switching unit 209 may be implemented as a part of the charge unit 206. The communication unit 204 performs communication for power reception control based on the WPC standard as described above with the communication unit 104 of the TX. The communication unit 204 demodulates the electromagnetic waves received from the power receiving antenna 205 and obtains the information transmitted from the TX. Also, the communication unit 204 performs communications with the TX by superimposing, on electromagnetic waves, a signal relating to the information to be transmitted to the TX via load modulation of the received electromagnetic waves. Note that, the communication unit 204 may communicate with the TX via communication using a standard other than the WPC standard using an antenna other than the power receiving antenna 205, or the communication unit 204 may communicate with the TX selectively using a plurality of communications.

The memory 208 stores the control program as well as the state of the TX and the RX. For example, the state of the RX may be obtained by the control unit 201, the state of the TX may be obtained by the control unit 101 of the TX, and these may be received via the communication unit 204.

Figure 3:
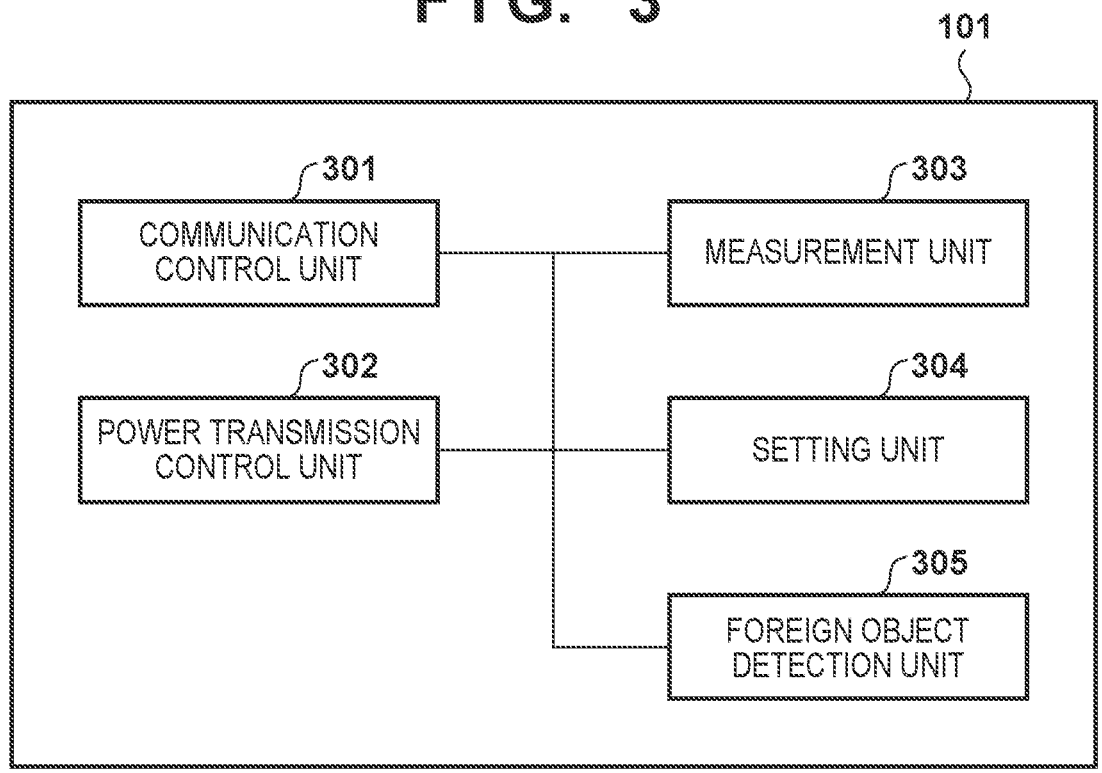
FIG. 3 is a block diagram illustrating an example of the functional configuration of a control unit of the power transmitting apparatus.

Next, the functions of the control unit 101 of the TX 402 will be described with reference to FIG. 3. FIG. 3 is a block diagram illustrating an example of the functional configuration of the control unit 101 of the power transmitting apparatus 402 (TX). The control unit 101 includes a communication control unit 301, a power transmission control unit 302, a measurement unit 303, a setting unit 304, and a foreign object detection unit 305. The communication control unit 301 performs control of communication with the RX based on the WPC standard via the communication unit 104. The power transmission control unit 302 controls the power transmitting unit 103 and controls transmitting power to the RX. The measurement unit 303 measures the waveform attenuation rate described below. Also, the measurement unit 303 measures the power output to the RX via the power transmitting unit 103 and measures the average output power per unit time. Also, the measurement unit 303 measures the Q-factor of the power transmitting antenna (power transmitting coil). The setting unit 304 executes calculation processing and sets the threshold used in foreign object detection on the basis of the waveform attenuation rate measured by the measurement unit 303.

The foreign object detection unit 305 may implement a foreign object detection function via the power loss method, a foreign object detection function via the Q-factor measurement method, and a foreign object detection function via the waveform attenuation method. Also, the foreign object detection unit 305 may have a function for executing foreign object detection processing using another method. For example, in a case where the TX is provided with a near-field communication (NFC) communication function, the foreign object detection unit 305 may execute foreign object detection processing using an opposing device detection function using the NFC standard. Also, in addition to the function of detecting foreign objects, the foreign object detection unit 305 may also be capable of detecting a change in the state of the TX. For example, the TX can detect an increase or decrease in the number of power receiving apparatuses on the TX. The setting unit 304 sets the threshold which is the reference for determining whether or not there is a foreign object for when the TX performs foreign object detection via the power loss method, the Q-factor measurement method, or the waveform attenuation method. Also, the setting unit 304 may have the function of setting the threshold which is the reference for determining whether or not there is a foreign object necessary for when foreign object detection processing is executed using a different method. Also, the foreign object detection unit 305 can execute foreign object detection processing on the basis of the threshold set by the setting unit 304 and the waveform attenuation rate measured by the measurement unit 303, the output power, or the Q-factor.

The functions of the communication control unit 301, the power transmission control unit 302, the measurement unit 303, the setting unit 304, and the foreign object detection unit 305 are implemented as a program operating via the control unit 101. Each processing unit may be configured as an independent program and operate in parallel with the programs being in sync via event processing or the like.

Processing Flow for Power Transmission According to WPC Standard

Figure 5A:
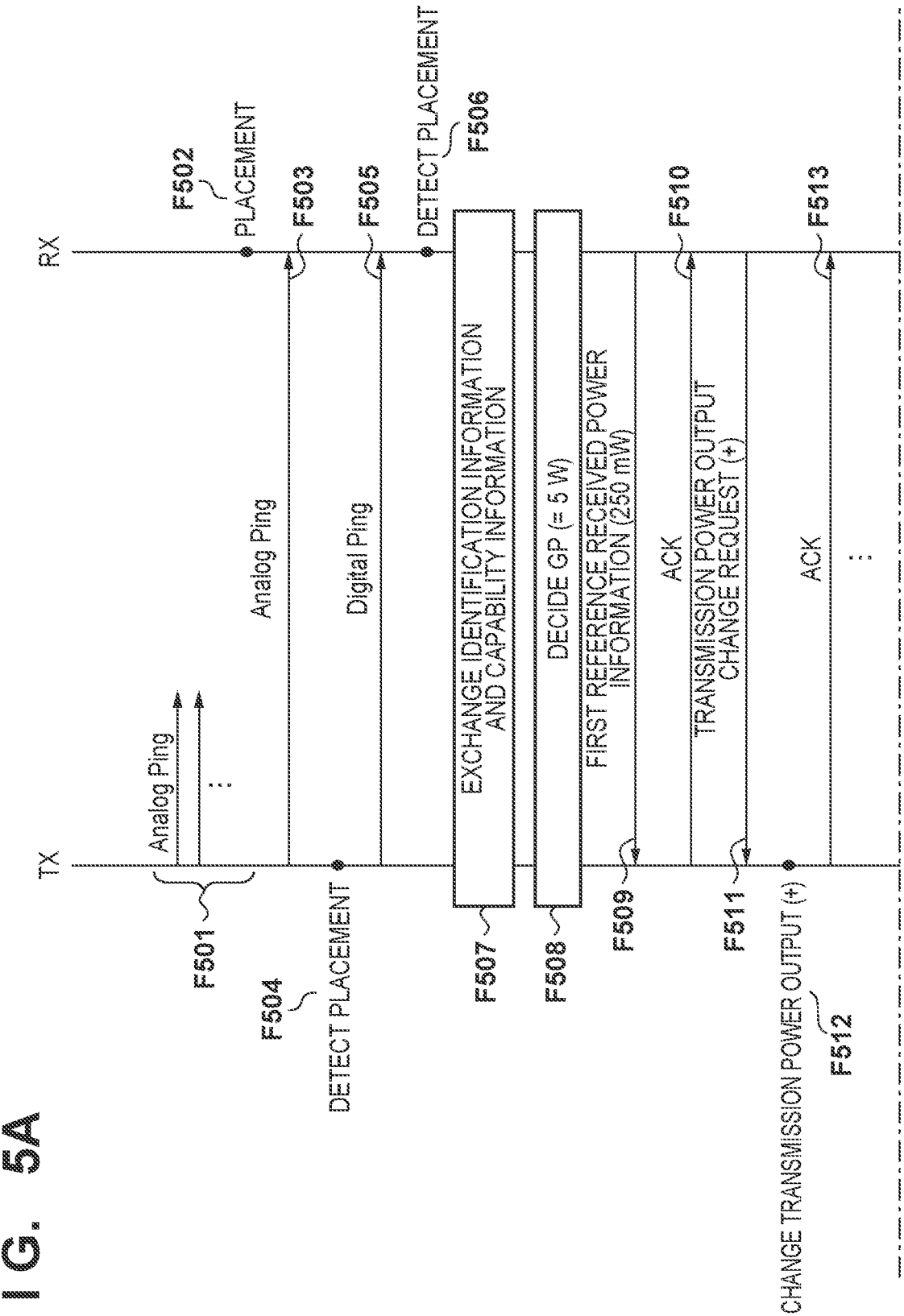
FIG. 5A is a sequence diagram for power transmission according to the WPC standard.

Next, the operations of the power transmitting apparatus and the power receiving apparatus in the selection phase, the ping phase, the I&C phase, the negotiation phase, the calibration phase, and the power transfer phase as set in the WPC standard will be described using the sequence diagrams of FIGS. 5A and 5B. FIGS. 5A and 5B are sequence diagrams for power transmission according to the WPC standard. In the following description, the power transmitting apparatus 402 (TX) and the power receiving apparatus 401 (RX) will be used as examples.

The TX, in order to detect an object that is present within the power-transmittal range, repeated and intermittently transmits an analog ping of the WPC standard (F501). The TX executes processing defined in the WPC standard as a selection phase and a ping phase and waits for the RX to be placed. The user of the RX (for example, a smart phone) brings the RX near the TX to charge the RX (F502). For example, the RX is brought near the TX by the RX being placed on the TX. When the TX detects that an object is present within the power-transmittal range (F503, F504), the TX transmits a digital ping of the WPC standard (F505). When the RX receives the digital ping, the RX learns that the TX has detected the RX (F506). Also, in a case where a predetermined response to the digital ping is received, then the TX determines that the detected object is the RX, and the RX has been placed on the charging stand 403. When the TX detects the placement of the RX, the TX obtains identification information and capability information from the RX via communication of the I&C phase as set by the WPC standard (F507). Here, the identification information of the RX includes a manufacturer code and a basic device ID. Also, the capability information of the RX includes information elements for identifying the compatible version of the WPC standard, the maximum power value, which is the value for specifying the maximum power able to be supplied to the load by the RX, information indicating whether or not a negotiation function according to the WPC standard is possessed, and the like. Note that the TX may obtain the identification information and the capability information of the RX by a method other than I&C phase communication according to the WPC standard. Also, the identification information may be a wireless power ID or other discretionary identification information that allows the individual RX to be identified. As the capability information, information other than that described above may be included.

Next, the TX decides the values of the RX and GP via the negotiation phase set by the WPC standard (F508). Note that in F508, the GP can be decided using other method without using the communication of the negotiation phase of the WPC standard. Also, configuration may be such that, in a case where the TX obtains information (in F507 for example) that the RX does not support the negotiation phase, the TX does not perform negotiation phase communication and sets the value of the GP as the minimum value (set in advance by the WPC standard, for example). In the present embodiment, GP=5 watt.

After the GP is decided, the TX performs calibration on the basis of the GP. In the calibration processing, first, the RX transmits, to the TX, information (hereinafter referred to as first reference received power information) including the received power when in a light load state (load disconnected state, load state in which the transmission power is equal to or less than a first threshold) (F509). The first reference received power information of the present embodiment corresponds to the received power information of the RX when the transmission power of the TX is 250 milliwatt. The first reference received power information is a received power packet (mode1) as set by the WPC standard, but a different message may be used. The TX determines whether or not to receive the first reference received power information on the basis of the power transmission state of the TX. In the case of receiving, the TX transmits an affirmative response, i.e., ACK, to the RX, and in the case of not receiving, the TX transmits a negative response, i.e., NAK, to the RX.

Next, when the RX receives an ACK from the TX (F510), the RX transmits, to the TX, information (hereinafter referred to as second reference received power information) including the received power when in a connected load state (load state in which the transmission power is equal to or greater than a second threshold). In the present embodiment, as the GP is 5 watt, the second reference received power information corresponds to the received power information of the RX when the transmission power of the TX is 5 watt. Here, the second reference received power information is a received power packet (mode2) as set by the WPC standard, but a different message may be used. In order to increase the transmission power from the TX to 5 watt, the RX transmits a transmission power output change instruction including a positive value (F511).

In a case where the TX receives the transmission power output change instruction described above and can support an increase in the transmission power, the TX responds with an ACK and increases the transmission power (F512, F513). Because the second reference received power information is the received power information when the transmission power of the TX is 5 watt, in a case where the TX receives from the RX a power increase request greater than 5 watt (F514), the TX responds to the transmission power output change instruction with a NAK in order to suppress a power transmission of a specified value or greater (F515).

When the RX determines that a predetermined received power has been reached via reception of a NAK from the TX, the RX transmits information including the received power in a connected load state to the TX as the second reference received power information (F516). The TX can calculate the power loss amount between the TX and the RX on the basis of the transmission power value of the TX and the received power value included in the first reference received power information and the second reference received power information, and by interpolating these can calculate the power loss value between the TX and the RX for all TX transmission power times (in this case, for when the TX transmission power is from 250 milliwatt to 5 watt) (F517). The TX transmits an ACK in response to the second reference received power information from the RX (F518) and ends the calibration processing. When the TX determines that charge processing can be started, the TX starts the processing of power transmission to the RX and starts charging the RX. Then, the TX and the RX execute device authentication processing (F519), and if it is determined that both devices can support a larger GP, the GP may be reset to a larger value, 15 watt in this case (F520).

As described above, in order to increase the transmission power of the TX to 15 watt, the RX and the TX use a transmission power output change instruction, ACK, and NAK to increase the transmission power output (F521 to F524). The TX and the RX again execute calibration processing using a GP of 15 watt. Specifically, the RX transmits information (hereinafter referred to as third reference received power information) including received power information when the RX is in a connected load state and the transmission power of the TX is 15 watt (F525). The TX performs calibration on the basis of the received power included in the first, second, and third reference received power information and can calculate the power loss amount between the TX and the RX for all TX transmission power times (in this case, for when the TX transmission power is from 250 milliwatt to 15 watt) (F526). The TX transmits an ACK in response to the third reference received power information from the RX (F527) and ends the calibration processing. When the TX determines that charge processing can be started, the TX starts the processing of power transmission to the RX and transitions to the power transfer phase (F528).

In the power transfer phase, the TX transmits power to the RX. Also, foreign object detection is performed via the power loss method. In the power loss method, first, the TX calculates in advance the power loss amount of a state in which there is no foreign object between the TX and the RX from the difference between the transmission power of the TX and the received power of the RX via the calibration described above. The calculated value corresponds to the reference power loss amount of a normal state (a state in which there is no foreign object) during power transmission processing. Thus, in a case where the power loss amount between the TX and the RX calculated during power transmission thereafter is a value away from the power loss amount of a normal state by a value equal to or greater than a threshold, the TX determines that there is a foreign object.

In this manner, during the power transfer phase, foreign object detection is performed via the power loss method. However, with only one foreign object detection method, there is a possibility of false detection of a foreign object and a possibility of false determination even in the case of there being a foreign object. In order to further improve the accuracy of foreign object detection, it is preferable that a combination of a plurality of foreign object detection methods is used. In particular, the power transfer phase is a phase in which the TX transmits power, and in the case of a foreign object coming between the TX and the RX during power transmission, for example, heat generated from the foreign object increases. Thus, during this phase, is it preferable that a plurality of foreign object detection methods are performed to increase the foreign object detection accuracy. In the present embodiment, foreign object detection methods other than the power loss method are considered.

Foreign Object Detection Method Via Waveform Attenuation Method

Figure 6:
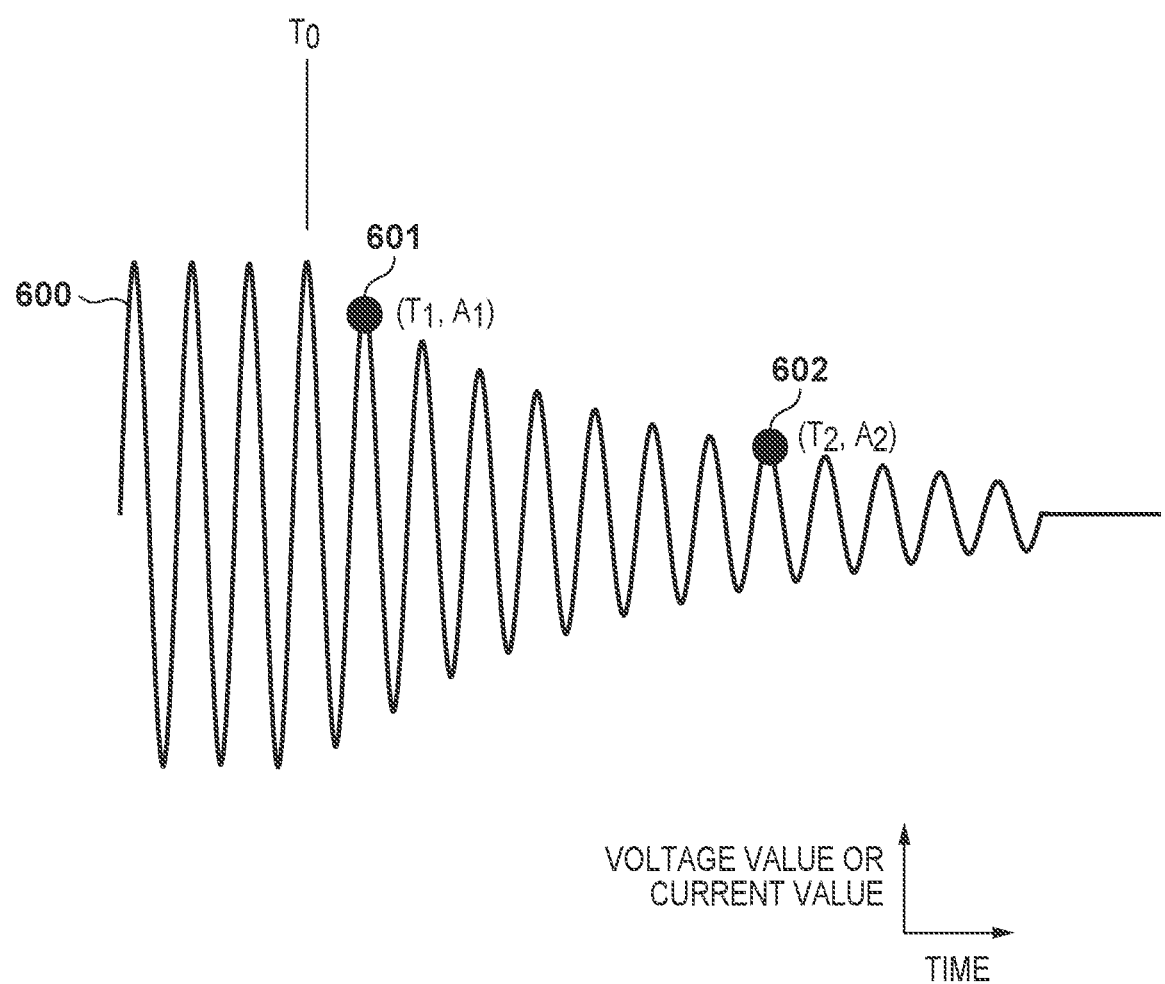
FIG. 6 is a diagram for describing the principle of foreign object detection via the waveform attenuation method.

In the power transfer phase, the power transmitting apparatus transmits power to the power receiving apparatus. Thus, if foreign object detection can be performed using the waveform of the power transmission, foreign object detection is possible without a new configuration for a foreign object detection signal or the like. A method (referred to as the waveform attenuation method below) for detecting foreign objects from the attenuation state of the transmission power waveform using the transmission power waveform will be described using FIG. 6. FIG. 6 is a diagram for describing the principle of the foreign object detection via the waveform attenuation method. In the following description, the power transmitting apparatus 402 (TX) and the power receiving apparatus 401 (RX) will be used as examples.

In FIG. 6, the waveform indicates a voltage value 600 (referred to simply as the voltage value below) of a high frequency voltage applied to the power transmitting antenna (power transmitting coil) of the TX over time, with the horizontal axis representing time and the vertical axis representing voltage value. The TX transmits power to the RX via the power transmitting antenna and, at time $T_0$, stops power transmission and stops applying the high frequency voltage to the power transmitting antenna (power transmitting coil). The frequency of the transmission power waveform transmitted from the TX is a predetermined (fixed) frequency. The frequency is between the 85 kHz and the 205 kHz used in the WPC standard. Point 601 is a part of the envelope of the high frequency voltage and the voltage value at time $T_1$. $(T_1, A_1)$ in the diagram indicates that the voltage value at time $T_1$ is $A_1$. Similarly, point 602 is a part of the envelope of the high frequency voltage and the voltage value at time $T_2$. $(T_2, A_2)$ in the diagram indicates that the voltage value at time $T_2$ is $A_2$. At this time, the quality factor (Q-factor) of the power transmitting antenna can be obtained from the change over time of the voltage value after time $T_0$. Specifically, for example, the quality factor can be calculated using Formula 1 from the time at the points 601 and 602 on the envelope of the voltage value, the voltage value, and a frequency f of the high frequency voltage.

$$Q=\pi f(T_2-T_1)/\ln(A_1/A_2) \qquad \text{(Formula 1)}$$

In a case where a foreign object is present between the TX and the RX, the Q-factor decreases. This is because when a foreign object is present, the foreign object causes a loss of energy. Thus, looking at the gradient of the waveform attenuation, the energy loss caused by the foreign object more so when there is a foreign object than when there is not a foreign object. Thus, the gradient of the straight line connecting the points 601 and 602 is steep and the waveform attenuation rate is high. In other words, the waveform attenuation method determines whether or not there is a foreign object from the attenuation state between the points 601 and 602 and, to actually determine whether or not there is a foreign object, can determine using a comparison of a kind of numerical value representing the attenuation state. For example, a comparison of the Q-factor described above may be used. A decrease in the Q-factor means that the waveform attenuation rate is increasing. Alternatively, a comparison of the value of the gradient of the straight line connecting the points 601 and 602 obtained from $(A_1-A_2)/(T_2-T_1)$ may be used. In a case where the time for measuring the waveform attenuation state is fixed, a comparison of $(A_1-A_2)$ representing the difference in voltage values or the value of ratio $(A_1/A_2)$ of the voltage value may be used. In a case where the voltage value $A_1$ when power transmission is performed is constant, a comparison of the voltage value $A_2$ after a predetermined amount of time has elapsed may be used. Alternatively, a comparison of the value of the time $(T_2-T_1)$ until the voltage value $A_1$ reaches the predetermined voltage value $A_2$ may be used.

As described above, whether or not there is a foreign object can be determined using the attenuation state of the waveform after stopping power transmission, and there are a plurality of values that represent the attenuation state. The values that represent the attenuation state are referred to as a waveform attenuation rate below. Also, as described above, the Q-factor calculated using Formula 1 is a value that represents the waveform attenuation state and is thus inclined in the waveform attenuation rate. Also, as described above, the vertical axis of FIG. 6 represents the voltage value applied to the power transmitting antenna (coil). However, even in a case where the current value flowing in the power transmitting antenna (coil) is used, in a similar manner to FIG. 6, the attenuation state of the waveform changes depending on whether or not there is a foreign object after power transmission stoppage, and, in a case where there is a foreign object, the attenuation rate increases more. Thus, by applying the method described above also to the current value flowing in the power transmitting antenna (coil), a foreign object can be detected by determining whether or not there is a foreign object from the Q-factor obtained from the current waveform, the gradient of the attenuation waveform, the difference in current values, the comparison of current values, the current value, the time taken to reach the predetermined current value, and the like. Note that, as described above, the waveform attenuation rate when the TX stops power transmission is measured. However, the waveform attenuation rate when the power transmitting apparatus decreases the transmitted power (voltage, current) to a predetermined value may be measured.

Figure 7:
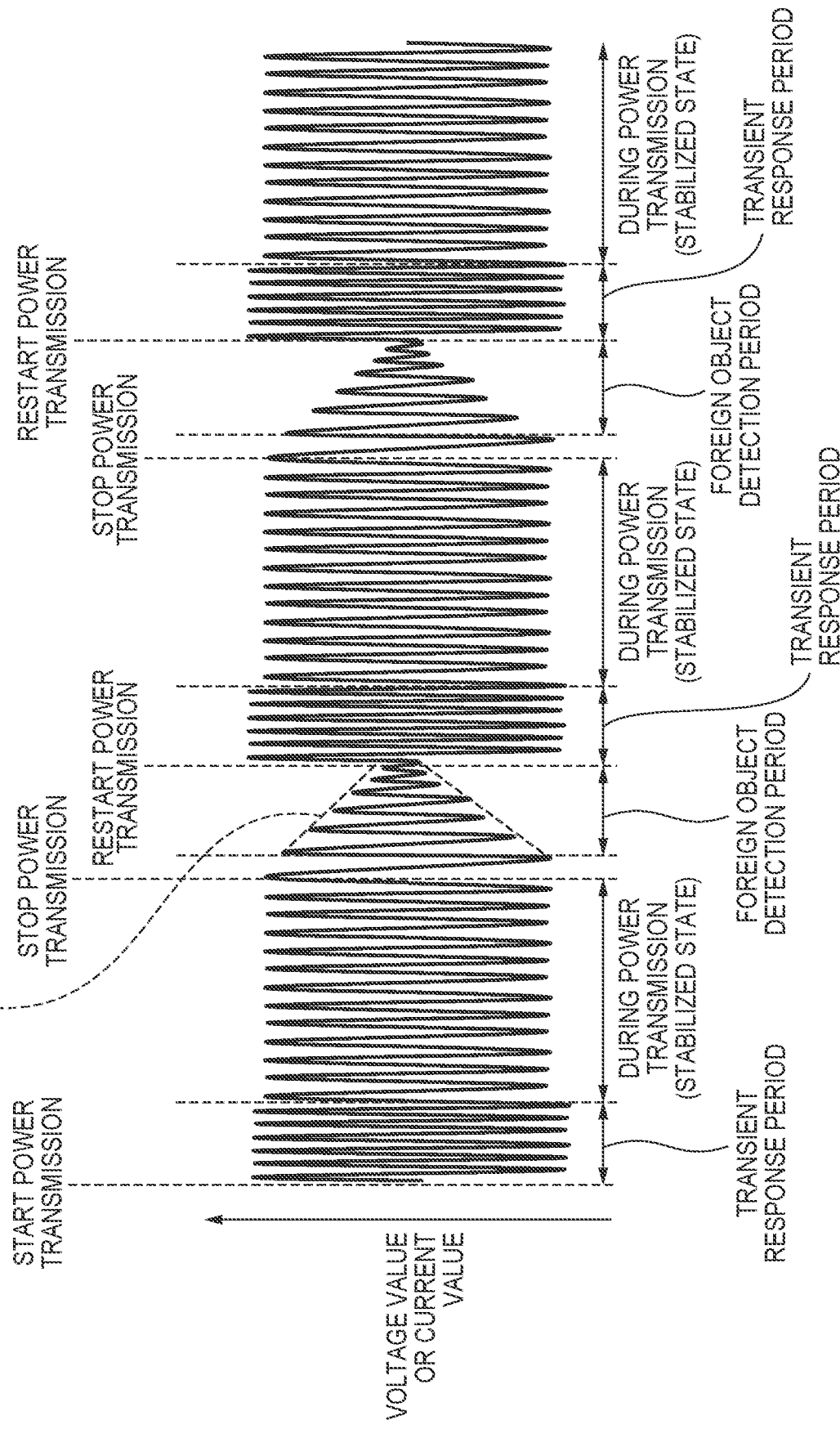
FIG. 7 is a diagram for describing the method of foreign object detection from the transmission power waveform during power transmission.

A method of foreign object detection from the transmission power waveform during power transmission using the waveform attenuation method will be described using FIG. 7. FIG. 7 is a diagram for describing the method of foreign object detection from the transmission power waveform during power transmission. In FIG. 7, the transmission power waveform when performing foreign object detection using the waveform attenuation method is illustrated, with the horizontal axis representing time and the vertical axis representing the voltage value of the power transmitting antenna (power transmitting coil). As in FIG. 6, the vertical axis may be the current value in the power transmitting antenna. The TX starts power transmission (power transmission start in FIG. 7). The transient response period (transient response period in FIG. 7) directly after the TX starts power transmission (power transmission start in FIG. 7) is a period in which the transmission power waveform is not stable. Thus, during the transient response period in which the transmission power waveform is not stable, control is performed so that the RX does not communicate (communicate via load modulation) with the TX. Also, control is performed so that the TX does not communicate (communicate via frequency shift modulation) with the RX.

The TX stops power transmission (power transmission stop in FIG. 7) when it is time for foreign object detection. Then, the transmission power waveform attenuates, with the attenuation waveform being used to calculate the waveform attenuation rate (Q-factor, gradient of the attenuation, or the like). This is used to then perform foreign object detection (foreign object detection period in FIG. 7). After a predetermined amount of time has elapsed, the TX restarts power transmission (power transmission restart in FIG. 7). In a similar manner as described above, the transient response period (transient response period in FIG. 7) directly after the TX starts power transmission (power transmission start in FIG. 7) is a period in which the transmission power waveform is not stable. Thus, during the transient response period in which the transmission power waveform is not stable, control is performed so that the RX does not communicate (communicate via load modulation) with the TX. Also, control is performed so that the TX does not communicate (communicate via frequency shift modulation) with the RX. The TX stops power transmission (power transmission stop in FIG. 7) when it is time for foreign object detection. Then, the transmission power waveform attenuates, with the attenuation waveform being used to calculate the waveform attenuation rate. This is used to then perform foreign object detection (foreign object detection period in FIG. 7). After a predetermined amount of time has elapsed, the TX restarts power transmission (power transmission restart in FIG. 7). This is the basic principle of foreign object detection using the waveform attenuation method.

Processing by Power Transmitting Apparatus in a Case where Waveform Attenuation Method is Applied to WPC Standard Next, the processing by the power transmitting apparatus in a case where the waveform attenuation method is applied to the WPC standard for foreign object detection will be briefly described. In a case where foreign object detection is performed using the waveform attenuation method, the power transmitting apparatus measures in advance the waveform attenuation rate in a state with no foreign object and calculates a threshold with that as the reference. In a case where foreign object detection is performed using the waveform attenuation method and the measured waveform attenuation rate is greater than the threshold, the power transmitting apparatus determines that there is a foreign object. In a case where the measured waveform attenuation rate is less than the threshold, the power transmitting apparatus determines that there is no foreign object.

The timing for measuring in advance the waveform attenuation rate in a state with no foreign object will now be described. As per the WPC standard, in the negotiation phase as described above, foreign object detection using the Q-factor measurement method is performed. Then, in a case where the result of the foreign object detection corresponds to a determination that there is no foreign object, the phase moves forward to the calibration phase and the power transfer phase. In other words, that the phase has advanced to a phase after the negotiation phase means that the result of the foreign object detection using the Q-factor measurement method corresponds to a determination that there is no foreign object. Thus, if the waveform attenuation rate is measured in any one of the negotiation phase, the calibration phase, of the power transfer phase, there is a high possibility that the waveform attenuation rate in a state with no foreign object can be measured (because in the negotiation phase, it is determined that there is no foreign object via foreign object detection using the Q-factor measurement method). Thus, the timing of measuring the waveform attenuation rate in a state with no foreign object may be in any one of the negotiation phase, the calibration phase, or the power transfer phase.

In the present embodiment, among these, the case of the timing being during the power transfer phase will now be described. The timing of measuring the waveform attenuation rate in a state with no foreign object is set to the initial stage of the power transfer phase. This is because as time elapses, the probability of a foreign object being between the power transmitting apparatus and the power receiving apparatus increases. The waveform attenuation rate of the transmission power waveform is measured by the power transmitting apparatus at the time of foreign object detection specified by the power receiving apparatus or the power transmitting apparatus. The power transmitting apparatus then determines whether or not there is a foreign object by comparing the waveform attenuation rate measured thereafter to the threshold calculated from the waveform attenuation rate in a state with no foreign object described above.

Flow of Processing According to First Embodiment

Figure 8:
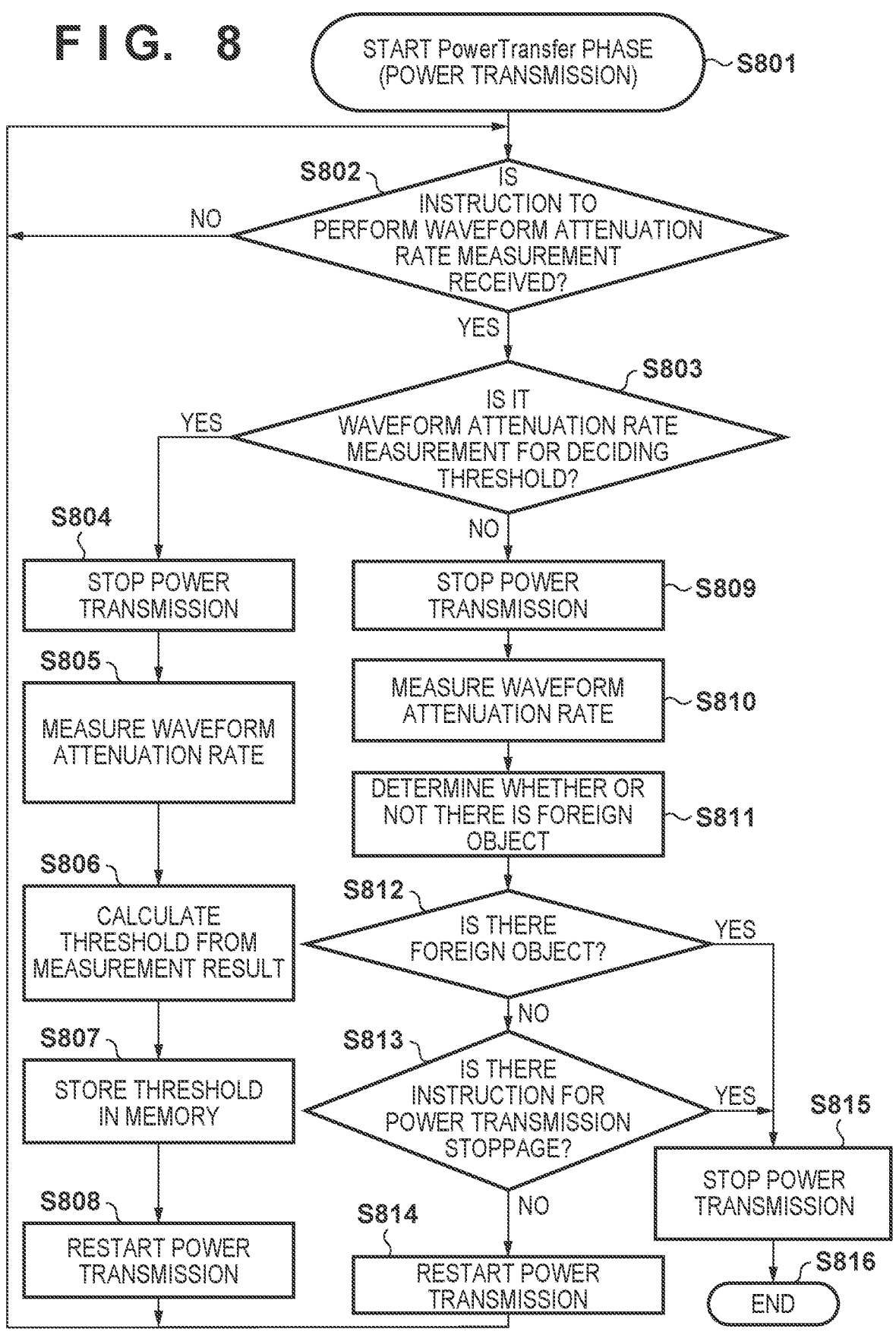
FIG. 8 is a flowchart of the processing executed by the power transmitting apparatus according to some embodiments.
Figure 9:
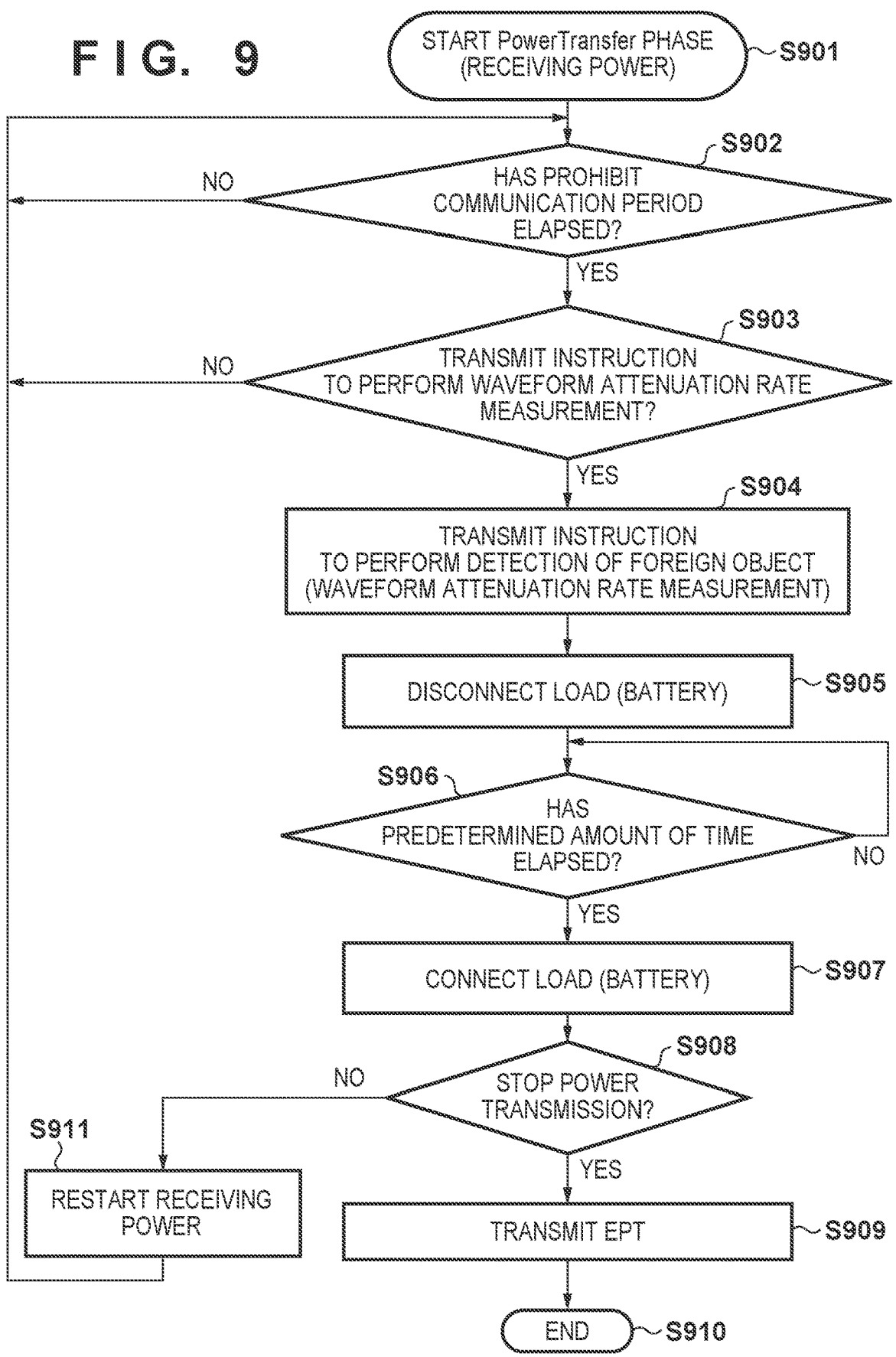
FIG. 9 is a flowchart of the processing executed by the power receiving apparatus according to some embodiments.
Figure 10A:
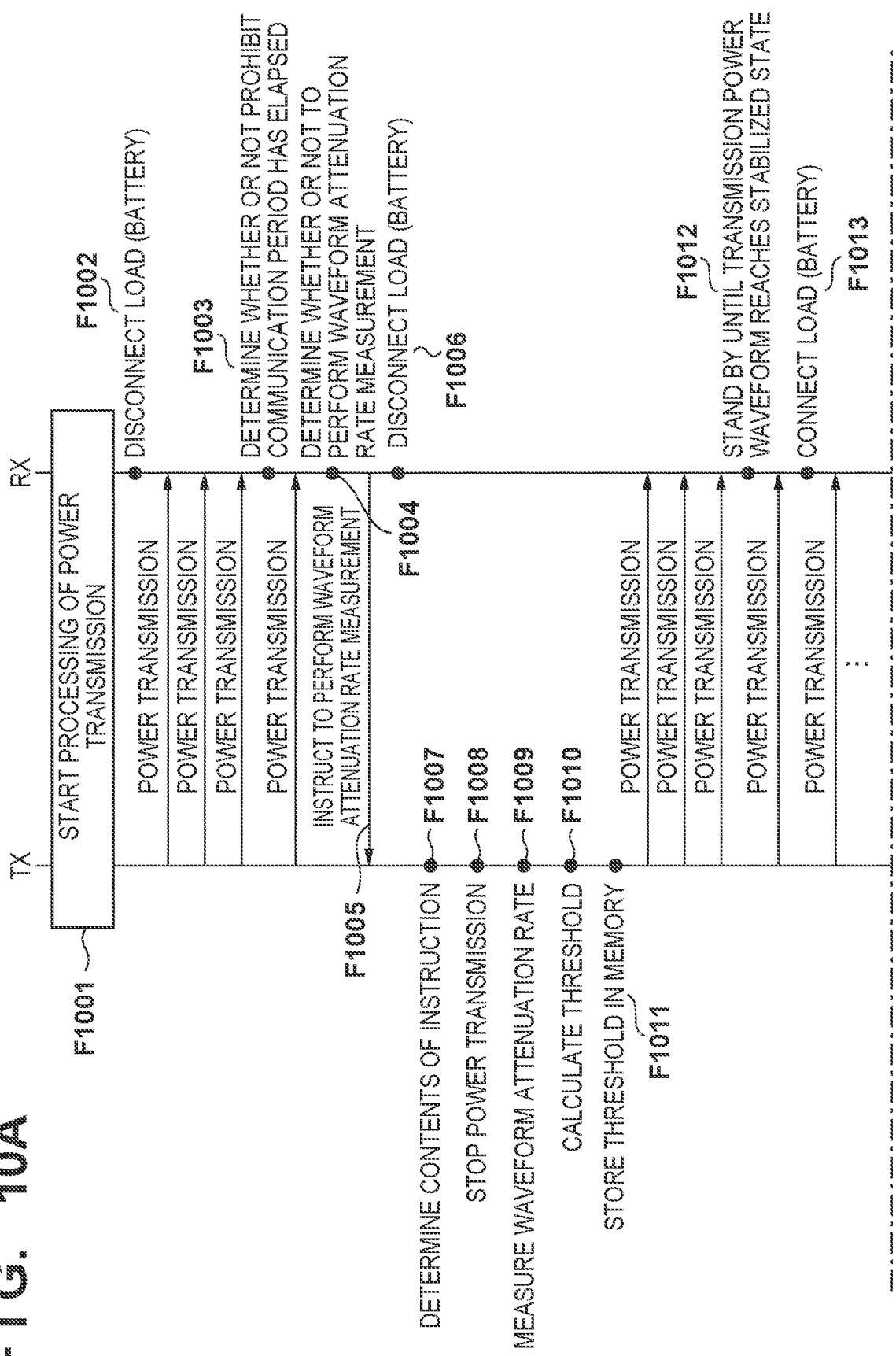
FIG. 10A is a sequence diagram of the power transmitting apparatus and the power receiving apparatus according to some embodiments.

The flow of the foreign object detection processing by the power transmitting apparatus and the power receiving apparatus will be described in detail with reference to FIGS. 8, 9, 10A, and 10B. FIG. 8 is a flowchart of the processing executed by the power transmitting apparatus according to the present embodiment. FIG. 9 is a flowchart of the processing executed by the power receiving apparatus according to the present embodiment. FIGS. 10A and 10B are sequence diagrams of the power transmitting apparatus and the power receiving apparatus. In the following description, the power transmitting apparatus 402 (TX) and the power receiving apparatus 401 (RX) will be used as examples. Also, as described above, in the present embodiment, foreign object detection processing is executed during the power transfer phase.

(1) Setting Threshold for Foreign Object Detection Using Waveform Attenuation Method First, the flow of the processing for setting the threshold for foreign object detection using the waveform attenuation method will be described. When the wireless power transmission system enters the power transfer phase, the TX starts power transmission (step S801, F1001) and the RX starts power reception (step S901). At this stage, the RX disconnects the switching unit 209 and disconnects the load (battery 207) of the RX (F1002). After the TX starts power transmission, the RX determines whether or not a prohibit communication period (predetermined amount of time) has elapsed (step S902, F1003). This is to wait for the transmission power waveform to stabilize to a normal state, as the transmission power waveform does not stabilize until the prohibit communication period has elapsed. After the prohibit communication period has elapsed, the RX determines whether or not to measure the waveform attenuation rate (step S903, F1004). In a case where the waveform attenuation rate threshold for foreign object detection has not been set (calculated), the RX determines to set the waveform attenuation rate. In this case, the RX transmits to the communication unit 104 an instruction for the TX to perform waveform attenuation rate measurement (step S904, F1005). The instruction is a command for requesting for the TX to perform measurement of the waveform attenuation rate for setting the threshold for foreign object detection using the waveform attenuation method. Then, the RX disconnects the switching unit 209 and disconnects the load (battery 207) of the RX (step S905, F1006). Note that the switching unit 209 may be disconnected before the command is transmitted (step S904).

Here, the reason for disconnecting the load (battery 207) of the RX will be described. The waveform attenuation rate fluctuates influenced by the state of the load (battery 207) of the RX or the state of the transmission power of the TX. Thus, when the waveform attenuation rate is measured, in order to remove the effect of the load (battery 207) of the RX in advance, measurement is performed after disconnecting the load. The TX determines whether or not an instruction for waveform attenuation rate measurement has been received from the RX via the communication unit 104 (step S802). In a case where an instruction has been received (yes in step S802), the TX determines whether or not the contents of the received instruction are to measure the waveform attenuation rate for deciding the threshold (step S803, F1007). In a case where the received instruction is a command requesting for measurement to be performed for setting the threshold for foreign object detection (yes in step S803), the TX temporarily stops (interrupts) power transmission (step S804, F1008). Then, the TX measures the waveform attenuation rate after a predetermined amount of time has elapsed (step S805, F1009). The reason for waiting for a predetermined amount of time to elapse is because directly after power transmission is stopped, the transient response is in an unstable state. Next, the TX calculates the threshold from the waveform attenuation rate measured in step S805 (step S806, F1010). For example, the TX adds a predetermined margin to the measured waveform attenuation rate and calculates the obtained value as the threshold. Then, the TX stores the calculated threshold in the memory 106 (step S807, F1011). The TX then restarts power transmission (step S808).

The RX waits for a predetermined amount of time to elapse until the TX restarts power transmission and the transmission power waveform reaches a stabilized state (step S906, F1012). Here, a predetermined amount of time is waited because in a case where the transmission power waveform during power transmission is not stable (not in a normal state), there is a possibility of excessive power being applied to the RX. After the predetermined amount of time has elapsed, the RX connects the load (battery 207) (step S907, F1013). The RX determines whether or not to request for power transmission stoppage when the battery 207 reaches a full charge or the like, for example (step S908). In a case where it is determined to request for power transmission stoppage (yes in step S908), the RX requests for power transmission stoppage by transmitting (step S909) an end power transfer (EPT) command to the TX, and then the processing ends (step S910). In step S908, in a case where power transmission stoppage is not requested (no in step S908), the RX starts power reception (step S911). With the operations described above, the TX measures the waveform attenuation rate in a state with no foreign object, and can set a threshold required to determine whether or not there is a foreign object from the result.

(2) Operations of Foreign Object Detection

Next, the operations for performing foreign object detection will be described. The TX is transmitting power (step S801), and the RX is receiving power (step S901). The RX determines whether or not the prohibit communication period has elapsed (step S902, F1014). After the prohibit communication period has elapsed, the RX determines whether or not to measure the waveform attenuation rate (step S903, F1015). The RX determines to measure the waveform attenuation rate for foreign object detection to check whether or not a foreign object is presents. In this case, the RX transmits to the communication unit 104 an instruction for the TX to perform waveform attenuation rate measurement (step S904, F1016). The instruction is a command for requesting for the TX to perform foreign object detection (determine whether or not there is a foreign object) using the waveform attenuation method. Then, the RX disconnects the switching unit 209 and disconnects the load (battery 207) of the RX (step S905, F1017). Note that the switching unit 209 may be disconnected before the command is transmitted (step S904). The reason for disconnecting the load of the RX is as described above. The TX, using the communication unit 104, determines whether or not an instruction to perform waveform attenuation rate measurement has been received from the RX (step S802), and in a case where an instruction has been received (yes in step S802), the TX determines whether or not the contents of the received instruction are to measure the waveform attenuation rate for deciding the threshold (step S803, F1018). In a case where the received instruction is a command requesting for foreign object detection using the waveform attenuation method be performed (determination of whether or not there is a foreign object) (no in step S803), the TX temporarily stops (interrupts) power transmission (step S809, F1019). Then, the TX measures the waveform attenuation rate after a predetermined amount of time has elapsed (step S810, F1020). The reason for waiting for a predetermined amount of time to elapse is because directly after power transmission is stopped, the transient response is in an unstable state. Next, the TX determines whether or not there is a foreign object by comparing the threshold calculated in step S806 and the waveform attenuation rate measured in step S810 (step S811, F1021). In a case where the determination result is that it is determined that there is a foreign object (yes in step S812), the TX stops power transmission (step S815, F1023), and the processing ends (step S816). In a case where the determination result is that it is determined that there is no foreign object (no in step S812), the TX determines whether or not there has been an instruction (whether an EPT command has been received) for power transmission stoppage from the RX (step S813). In a case where there has been a power transmission stoppage instruction (yes in step S813), the TX stops power transmission (step S815), and the processing ends (step S816). In a case where there has not been a power transmission stoppage instruction (no in step S813), the TX restarts power transmission (step S814).

The RX waits for a predetermined amount of time to elapse until the TX restarts power transmission and the transmission power waveform reaches a stabilized state (step S906). The reason for waiting a predetermined amount of time is as described above. After the predetermined amount of time has elapsed, the RX connects the load (battery 207) (step S907). The RX determines whether or not to request for power transmission stoppage when the battery 207 reaches a full charge or the like, for example (step S908). In a case where it is determined to request for power transmission stoppage (yes in step S908), the RX requests for power transmission stoppage by transmitting an EPT command to the TX, and then the processing ends (step S910). In a case where the RX determines that power transmission from the TX is not being performed due to the TX determining that there is a foreign object (yes in step S812), the RX requests for power transmission stoppage by transmitting an EPT command to the TX (F1024), and the processing ends (step S910). Accordingly, power transmission can be ended normally. Alternatively, the processing may end without the RX transmitting an EPT command to the TX (step S910), and the RX may transition to a reset state (standby state). In step S908, in a case where power transmission stoppage is not requested (no in step S908), the RX starts power reception (step S910). With the operations described above, the TX can determine whether or not there is a foreign object between the TX and the RX using the waveform attenuation rate of the transmission power waveform.

Note that in the embodiment described above, when the waveform attenuation rate is measured, in order to remove the effect of the load of the RX in advance, measurement is performed after disconnecting the load of the RX. Instead of this, when the waveform attenuation rate is measured, in order to decrease the effect of the load of the RX in advance, measurement may be performed after controlling the value of the load of the RX. This may be implemented by controlling the load so that a state in which only a small amount of power is supplied to the RX is implemented or a light load state of the load of the RX is implemented.

Note that in the embodiment described above, the timing of the measurement of the waveform attenuation rate by the TX is implemented by an instruction from the RX to the TX (step S803). Instead of this, the TX may decide the timing, and the timing may be implemented by the TX notifying the RX. Specifically, for example, instead of the processing of steps S802 and S803 of FIG. 8, the TX may first determine whether or not the prohibit communication period has elapsed. Then, after the prohibit communication period has elapsed, the TX may determine whether or not to measure the waveform attenuation rate for deciding the threshold. Alternatively, whether or not to measure the waveform attenuation rate for foreign object detection is determined. When the TX determines to measure the waveform attenuation rate, the TX decides the timing of the waveform attenuation rate measurement and notifies the RX of this timing. Note that the TX may simultaneously notify the RX that the waveform attenuation rate measurement is measurement for deciding a threshold in a case where it is measurement for deciding a threshold and notify the RX that the waveform attenuation rate measurement is measurement for foreign object detection in a case where it is for foreign object detection. Then, the RX disconnects the switching unit 209 and disconnects the load (battery 207) of the RX at the timing when measurement is performed. Alternatively, the load may be controlled so that the value of the load (battery 207) of the RX transitions to a light load state. In this manner, the TX can measure the waveform attenuation rate. Also, the timing of the measurement of the waveform attenuation rate by the TX may be configured such that the measurement is performed at a predetermined timing. At the predetermined timing, the TX performs waveform attenuation rate measurement and the RX disconnects the load or controls the load so that the value of the load is set to that of a light load state, allowing the timing of the measurement to be implemented. Also, the TX may be configured such that when there is an instruction for setting the threshold for foreign object detection form the user, the process proceeds to step S804, and when there is an instruction for foreign object detection from the user, the process proceeds to step S809. An instruction from the user may be implemented by a predetermined input to or an interaction with the TX.

Also, in the method for determining whether or not there is a foreign object according to the embodiment described above, the TX measures the attenuation rate of the voltage applied to the power transmitting antenna (power transmitting coil) of the TX or the attenuation rate of the current flowing in the power transmitting antenna (power transmitting coil) of the TX. However, the power transmitting antenna (power transmitting coil) and the power receiving antenna (power receiving coil) may face one another and be electromagnetically joined, so that the electromagnetic energy of the power transmitting antenna also excites the power receiving antenna. Thus, whether or not there is a foreign object can be determined by the RX by measuring the attenuation rate of the voltage applied to the power receiving antenna (power receiving coil) of the RX or measuring the attenuation rate of the current flowing in the power receiving antenna (power receiving coil).

Also, in a case where the TX has measured the waveform attenuation rate, the TX may notify the RX of the waveform attenuation rate or the threshold obtained from the waveform attenuation rate. This enables the RX side also to be able to determine whether or not there is a foreign object. Alternatively, in a case where the RX has measured the waveform attenuation rate, the RX may notify the TX of the waveform attenuation rate or the threshold obtained from the waveform attenuation rate. This enables the TX side also to be able to determine whether or not there is a foreign object.

Also, in the embodiment described above, in a case where foreign object detection is performed using the waveform attenuation method, the waveform attenuation rate in a state with no foreign object is measured in advance and a threshold with that as the reference is calculated. In a case where foreign object detection is performed using the waveform attenuation method and the measured waveform attenuation rate is greater than the threshold, it is determined that there is a foreign object. In a case where the measured waveform attenuation rate is less than the threshold, it is determined that there is no foreign object. However, foreign object detection may be performed by comparing using the threshold obtained from a previous waveform attenuation rate measured at time where it is expected that there was no foreign object. For example, first, the power loss method is used to check that there is no foreign object. Next, using the waveform attenuation method, a first measurement of the waveform attenuation rate is performed, and the threshold is calculated. In this case, because it has been confirmed that there is no foreign object in advance via the power loss method, the waveform attenuation rate or the threshold can be considered to be a value for a state with no foreign object. Next, using the waveform attenuation method, a second measurement of the waveform attenuation rate is performed, and the threshold is calculated. At this time, to perform foreign object detection, these are compared to the measurement result of the first measurement of the waveform attenuation rate and the threshold. This is because the measurement result of the first measurement of the waveform attenuation rate and the threshold are of a state with no foreign object. In other words, foreign object detection using the waveform attenuation method can be performed via a comparison using a previous waveform attenuation rate or the threshold considered to have been measured in a state with no foreign object.

Also, in the embodiment described above, the frequency of the transmission power waveform transmitted from the TX is a predetermined (fixed) frequency. However, using a plurality of frequencies, the operations for foreign object detection described in the embodiments may be performed for each frequency and the results may be combined to determine whether or not there is a foreign object. By not just using the waveform attenuation rate of a single predetermined (fixed) frequency, but by using the waveform attenuation rates of a plurality of frequencies, foreign object detection can be performed with a higher accuracy.

Also, in the present embodiment, after the TX stops transmitting power or after power transmission starts, the transmission power waveform is unstable due to the transient response. Thus, a waiting time is provided before transition to the operations. However, the cause of the transmission power waveform being unstable is the sudden start of power transmission and the sudden stop of power transmission. Thus, control may be performed to smooth out these and increase the power transmission incrementally when the TX starts power transmission. Alternatively, when the power transmission is stopped or temporarily stopped, control may be performed to decrease the power transmission incrementally.

Second Embodiment

In the method according to the first embodiment, control is performed so that the waveform attenuation rate is messaged after disconnecting the load of the power receiving apparatus in order to remove the effects of the load of the power receiving apparatus when measuring the waveform attenuation rate of the transmission power waveform after stopping the power transmission of the power transmitting apparatus. With this method, the load needs to be disconnected and connected by the power receiving apparatus at a predetermined timing and time for this is needed. This may lead to a decrease in power transmission efficiency. In the method of the present embodiment, when the waveform attenuation rate is measured, measurement is performed while connected, without disconnecting the load of the power receiving apparatus.

The transmission power of the power transmitting apparatus changes depending on the state of the load (battery) of the power receiving apparatus. In other words, by controlling the state of the load of the power receiving apparatus, the power receiving apparatus can control the transmission power from the power transmitting apparatus. The power transmitting apparatus is configured to measure in advance the waveform attenuation rate for each state (each transmission power value) of the load on the power receiving apparatus side in a state with no foreign object, and, on the basis of the measurement result, set the threshold used in determining whether or not there is a foreign object for each state (each transmission power) of the load on the power receiving apparatus side. When foreign object detection is performed, without disconnecting the load of the power receiving apparatus, the power transmitting apparatus measures the waveform attenuation rate and compares this to the threshold corresponding to the transmission power value to determine whether or not there is a foreign object.

The flow of the processing by the power transmitting apparatus 402 (TX) and the power receiving apparatus 401 (RX) will be described below. Note that the configuration of the TX and the RX, the processing flow, and the operation sequence are basically the same as in the first embodiment. The difference is in the method in which, in a case where the instruction received by the TX from the RX is a command requesting for measurement to be performed for setting the threshold for foreign object detection (yes in step S803), the waveform attenuation rate is measured in step S805. The method of the present embodiment in which the TX and the RX perform measurement for setting the threshold for foreign object detection using the waveform attenuation method will be described with reference to FIGS. 8 and 11.

Figure 11:
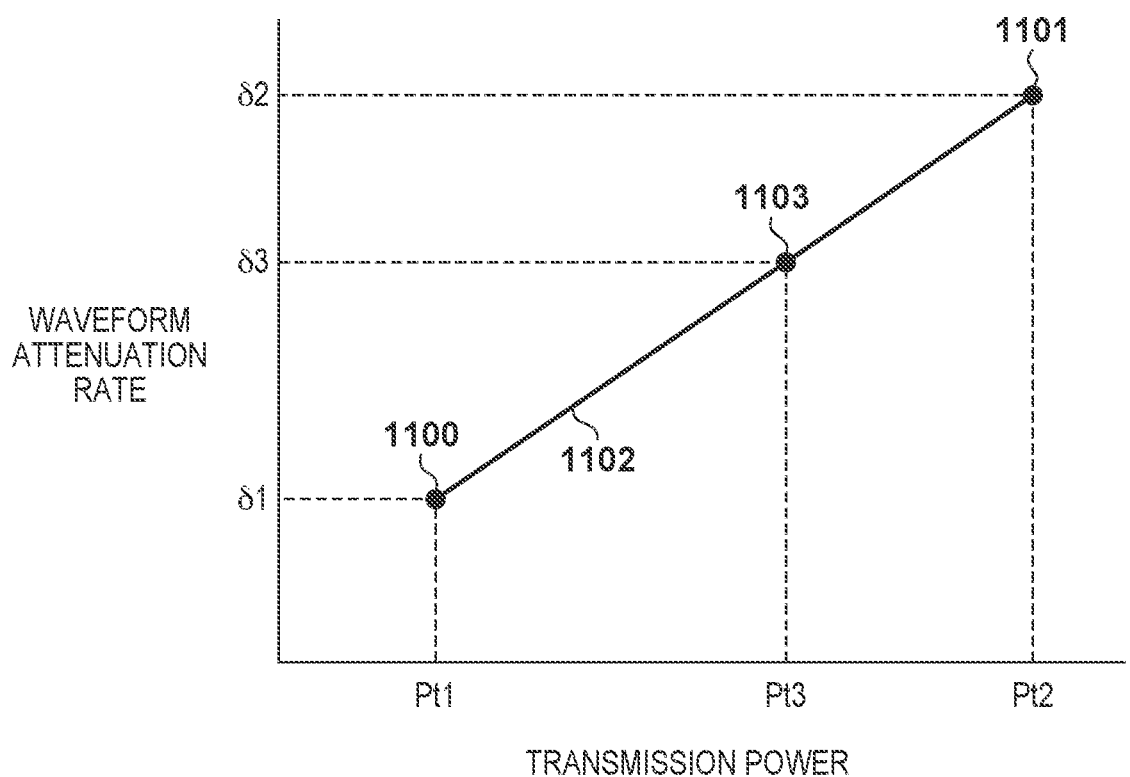
FIG. 11 is a diagram for describing the method of setting the threshold for foreign object detection via the waveform attenuation method.

FIG. 11 is a diagram for describing the method of setting the threshold for foreign object detection via the waveform attenuation method. First, in a case where the TX has transmitted power, the RX controls the state of the RX to be a light load state, making the state one in which power is not supplied to the load of the RX (disconnected) or only a very minimal amount of power is supplied to the load of the RX. The transmission power of the TX at this time is Pt1. Then, in this state, the TX stops power transmission (step S804) and measures the waveform attenuation rate (step S805). The waveform attenuation rate at this time is $\delta 1$. At this time, the TX associates together and stores in the memory the transmission power Pt1 (the power transmitting apparatus recognizes transmission power Pt transmitted by the power transmitting apparatus) and the waveform attenuation rate $\delta 1$ (point 1100). Next, in a case where the TX has transmitted power, the RX controls the load of the RX to be a connected load state, making the state one in which the maximum power is supplied to the load of the RX or power equal to or greater than a predetermined threshold is supplied to the load of the RX. The transmission power of the TX at this time is Pt2. Then, in this state, the TX stops power transmission (step S804) and measures the waveform attenuation rate (step S805). At this time, the TX associates together and stores in the memory the transmission power Pt2 and the waveform attenuation rate δ2 (point 1101). Next, the TX performs linear interpolation of the points 1100 and 1101 and creates a straight line 1102. The straight line 1102 indicates the relationship between the transmission power in a state in which no foreign object is present at or near the TX and the RX and the waveform attenuation rate of the transmission power waveform. Thus, the waveform attenuation rate of the transmission power waveform can be estimated by the TX for each transmission power value in a state with no foreign object from the transmission power value and the straight line 1102. For example, in a case where the transmission power value is Pt3, from a point 1103 on the straight line 1102 indicating the transmission power value is Pt3, the waveform attenuation rate can be estimated to be δ3. On the basis of the straight line 1102, the waveform attenuation rate of the transmission power waveform can be estimated by the TX for each transmission power value. Then, on the basis of these, the TX can calculate the threshold used to determine whether or not there is a foreign object for each transmission power value in a state with no foreign object.

Note that the RX may perform control (first control) of the load to bring it to a state in which power is not supplied or a light load state and may perform control (second control) of the load to bring it to a connected load state after notifying the TX about performing these controls. Also, either one of the two controls may be performed first.

In the first embodiment, the RX disconnects the load of the RX when foreign object detection is performed (determination of whether or not there is a foreign object is performed). However, in the present embodiment, the RX does not need to disconnect the load when foreign object detection is performed (determination of whether or not there is a foreign object is performed). When foreign object detection (determination of whether or not there is a foreign object) is performed, the TX can recognize the transmission power value that the TX is transmitting. Thus, by comparing this to the threshold calculated from FIG. 11, whether or not there is a foreign object can be determined. In other words, in the present embodiment, a threshold is set for each load (transmission power value). Thus, when foreign object detection (determination of whether or not there is a foreign object) is performed, it is sufficient that the waveform attenuation rate of the load (transmission power value) at that time and the threshold corresponding to the load (transmission power value) are compared. Thus, there is no need to disconnect the load of the RX as in the first embodiment.

In this manner, because there is no need for the RX to connect or disconnect the load when measuring the waveform attenuation rate for the TX to perform foreign object detection (determination of whether or not there is a foreign object), foreign object detection can be performed without a decrease in power transmission efficiency.

Note that in the present embodiment described above, the operations for calculating the threshold used to determine whether or not there is a foreign object for each load (each transmission power value) may be performed in the calibration phase. As described above, in the calibration phase, the TX obtains data required for foreign object detection using the power loss method. At this time, the TX obtains the data when the load state of the RX is the light load state and the connected load state. Thus, the point 1100 and the point 1101 of FIG. 11 can be measured together by the RX in the calibration phase described above when the state is a light load state and the connected load state. In other words, when the TX receives the first reference received power information from the RX, the point 1100 is measured in addition to executing the processing of the calibration phase. Also, when the TX receives the second reference received power information from the RX, the point 1101 is measured in addition to executing the processing of the calibration phase. In this manner, there is no need for additional processing for measuring the point 1100 and the point 1101, allowing the point 1100 and the point 1101 to be measured in a shorter amount of time.

Third Embodiment

In the method of the second embodiment, the threshold used to determine whether or not there is a foreign object is set for each load (each transmission power value transmitted by the power transmitting apparatus) of the power receiving apparatus, making it unnecessary to disconnect the load. Compared to the method of the second embodiment, the method of the present embodiment includes updating or adding a threshold for foreign object detection in a case where the state of the power transmitting apparatus or the power receiving apparatus changes or a case where the maximum value of the transmission power changes. In the following description, the power transmitting apparatus 402 (TX) and the power receiving apparatus 401 (RX) will be used as examples.

As illustrated in FIG. 11, in the second embodiment, by performing linear interpolation (straight line 1102) of the waveform attenuation rate (point 1100) when the transmission power of the TX is at the minimum and the waveform attenuation rate (point 1101) when the transmission power of the TX is at the maximum, in a state with no foreign object, the threshold for foreign object detection is calculated. However, the straight line 1102 obtained by linear interpolation in FIG. 11 may change when the state of the TX or the RX changes. For example, the temperature of the TX or the RX may increase. As the power transmitted by the TX or the transmission time increases, the temperature of the housing or internal circuits of the TX or the RX also increase. Alternatively, in a case where the RX is a mobile PC or a smart phone, the temperature may increase when an application or the like is used and when data processing is performed. An increase in temperature causes a change in the shape of the housing of the TX or the RX, a change in the electrical characteristic of the components of the electric circuit, and the like. When this occurs, the straight line 1102 in FIG. 11 changes, and the waveform attenuation rate in a state with no foreign object changes with respect to the transmission power values. In this case, the threshold for foreign object detection must be calculated again for each transmission power value. Also, in a case where the RX placed on the TX moves, the straight line 1102 in FIG. 11 changes, and the waveform attenuation rate in a state with no foreign object changes with respect to the transmission power values. In this case also, the threshold for foreign object detection must be calculated again for each transmission power value. Alternatively, as illustrated by F519 and F520 in FIG. 5B, for example, there is a possibility that device authentication is performed by each device and the GP to transmit or the maximum power changes. In a case where the GP or the maximum power changes, the relationship between the transmission power and the waveform attenuation rate of the transmission power greater than the transmission power Pt2 in FIG. 11 needs to be plotted. In other words, when the state of the TX or the RX changes, the relationship between the transmission power and the waveform attenuation rate illustrated in FIG. 11 needs to be updated or additions need to be made.

In a case where the state of the TX or the RX changes as described above and it is determined that there is a need to update or add a threshold used in foreign object detection, the RX transmits a command requesting for measurement to performed for setting the threshold for foreign object detection using the waveform attenuation method to the TX as in the first and second embodiment (yes in step S803). Then, the RX controls the load so that the transmission power corresponds to a point desired to be updated or added to the relationship between the transmission power and the waveform attenuation rate. After the TX receives the command, the TX temporarily stops power transmission (step S804) and measures the waveform attenuation rate of the transmission power waveform (step S805). Then, the TX associates together the transmission power and the measured waveform attenuation rate and updates or adds to the relationship between the transmission power and the waveform attenuation rate illustrated in FIG. 11. On the basis of this, the TX calculates the threshold for foreign object detection and updates or adds the threshold. Thereafter, this threshold is used by the TX to determine whether or not there is a foreign object. Note that in the embodiment described above, The RX performs the determination of whether or not the threshold used in foreign object detection needs to be updated or added. However, instead of this, the TX may perform the determination, and, in a case where the determination result is that it is determined that an update or addition of the threshold used in foreign object detection is necessary, this may be notified to the RX. Specifically, for example, in a case where there is a change in the state of the TX or the RX as described above and the TX determines that an update or an addition is needed for the threshold used in foreign object detection, the TX notifies the RX that measurement is to be performed for setting a threshold for foreign object detection using the waveform attenuation method for updating or adding the threshold used in foreign object detection. After the RX receives the notification, the RX controls the load so that the transmission power corresponds to a point desired to be updated or added to the relationship between the transmission power and the waveform attenuation rate. After control of the load is complete, the RX notifies the TX that the load control has complete. After the TX receives the notification, the TX temporarily stops power transmission (step S804) and measures the waveform attenuation rate of the transmission power waveform (step S805). Then, the TX associates together the transmission power and the measured waveform attenuation rate and updates or adds to the relationship between the transmission power and the waveform attenuation rate illustrated in FIG. 11. On the basis of this, the TX calculates the threshold for foreign object detection and updates or adds the threshold. Thereafter, this threshold is used by the TX to determine whether or not there is a foreign object.

According to the present embodiment, even in a case where the state of the power transmitting apparatus or the power receiving apparatus changes, the threshold for foreign object detection can be set to one suitable for that state.

Fourth Embodiment

In the embodiments described above with reference to FIGS. 8, 9, 10A, and 10B, the determination of whether or not there is a foreign object using the waveform attenuation method is performed during the power transfer phase, which is a phase in which the power transmitting apparatus 402 (TX) transmits power. Specifically, during the power transfer phase, when the power receiving apparatus 401 determines that whether or not there is a foreign object needs to be determined, the power receiving apparatus 401 transmits, to the TX, a command requesting for foreign object detection (determination of whether or not there is a foreign object) to be performed using the waveform attenuation method. Then, the TX receives the command, performs foreign object detection, and determines whether or not there is a foreign object.

In the WPC standard, the foreign object detection method using the power loss method is standardized as the method for foreign object detection. Specifically, when the power receiving apparatus determines that whether or not there is a foreign object needs to be determined, the power receiving apparatus transmits, to the power transmitting apparatus, a command requesting for foreign object detection (determination of whether or not there is a foreign object) to be performed using the power loss method. Then, the power transmitting apparatus receives the command, performs foreign object detection, and determines whether or not there is a foreign object.

As described above, in the power transfer phase in which the power transmitting apparatus transmits power, in the case of a foreign object coming between the power transmitting apparatus and the power receiving apparatus, heat generated from the foreign object increases. Thus, during this phase, is it preferable that a plurality of foreign object detection methods are performed to increase the foreign object detection accuracy. Taking this into account, in the present embodiment, a combination of two methods, the power loss method and the waveform attenuation method, is used to perform foreign object detection with a higher accuracy. The method will be described in detail below. In the following description, the power transmitting apparatus 402 (TX) and the power receiving apparatus 401 (RX) will be used as examples.

The first method includes performing foreign object detection during the power transfer phase periodically alternating between using the two methods, the power loss method and the waveform attenuation method. The RX instructs the TX to periodically alternate between the two methods, the power loss method and the waveform attenuation method, and the TX performs foreign object detection using both. In a case where it is determined that there is a foreign object with either method, the TX stops power transmission. In this manner, the foreign object detection result of only a single method is not depended upon, allowing for foreign object detection to be performed with a higher accuracy.

The second method includes stopping power transmission in a case where it is determined that there is a foreign object with the two methods, the power loss method and the waveform attenuation method. In a case where foreign object detection is periodically performed using the power loss method and it is determined that there is no foreign object, the TX continues power transmission. In a case where foreign object detection is periodically performed using the power loss method and it is determined using the power loss method that there is a foreign object, the TX performs foreign object detection using the waveform attenuation method. In a case where it is determined that there is a foreign object using the waveform attenuation method, power transmission is stopped. In other words, in a case where it is determined that there is a foreign object using both methods, control is performed to stop power transmission. Power transmission is stopped only in the case of both the power loss method and the waveform attenuation method producing a determination that there is a foreign object. This can reduce the probability of erroneously determining that there is a foreign object.

The third method includes continuing power transmission in a case where it is determined that there is no foreign object with the two methods, the power loss method and the waveform attenuation method. In a case where foreign object detection is periodically performed using the power loss method and it is determined using the power loss method that there is a foreign object, the TX stops power transmission. Alternatively, in a case where foreign object detection is periodically performed using the power loss method and it is determined that there is no foreign object, the TX performs foreign object detection using the waveform attenuation method. In a case where it is determined that there is a foreign object using the waveform attenuation method, power transmission is stopped. In a case where foreign object detection is performed using the waveform attenuation method and it is determined via the waveform attenuation method that there is no foreign object, the TX continues power transmission. Power transmission can be continued only in the case of both the power loss method and the waveform attenuation method producing a determination that there is no foreign object. This can reduce the probability of erroneously determining that there is no foreign object.

The fourth method includes, in a case where the two foreign object detection methods produce different determination results for whether or not there is a foreign object, performing foreign object detection again using either method, comprehensively determining whether or not there is a foreign object on the basis of the plurality of determination results, and appropriately controlling power transmission. In a case where foreign object detection is performed using the power loss method and it is determined using the power loss method that there is a foreign object, the TX performs foreign object detection using the waveform attenuation method. Then, in a case where it is determined using the waveform attenuation method that there is no foreign object, foreign object detection is performed again using either method (power loss method or waveform attenuation method). Alternatively, in a case where foreign object detection is performed using the power loss method and it is determined using the power loss method that there is no foreign object, the TX performs foreign object detection using the waveform attenuation method. Then, in a case where it is determined using the waveform attenuation method that there is a foreign object, foreign object detection is performed again using either method (power loss method or waveform attenuation method). The TX performs comprehensive determination on the basis of the determination results of there is a foreign object or there is no foreign object from the power loss method and the waveform attenuation method and appropriate controls power transmission by determining to continue power transmission or stop power transmission. For example, the number of determinations of there is a foreign object and the number of determinations of there is no foreign object are compared, and the larger of the two is taken as the final determination result. Alternatively, for example, in a case where it is determined that there is a foreign object with both the power loss method and the waveform attenuation method, that there is a foreign object may be taken as the final determination result. Alternatively, for example, in a case where it is determined that there is no foreign object with both the power loss method and the waveform attenuation method, that there is no foreign object may be taken as the final determination result. In a case where the two methods produce different determination results for whether or not there is a foreign object, foreign object detection is performed again using either method and whether or not there is a foreign object is comprehensively determined on the basis of the plurality of determination results. This allows appropriate determination on the basis of the determination results to be performed.

In the four methods described above, two determination results, there is a foreign object and there is no foreign object, are obtained as the foreign object detection determination result. As described in the first embodiment, the second embodiment, and the third embodiment, foreign object detection determination is based on whether the value measured is greater than or less than the calculated threshold. However, even when it is determined that there is no foreign object, there may be cases in which the margin with the threshold is small, leaving a suspicion that a foreign object is present. Even in a case where there is a suspicion that a foreign object is present, by applying any of the four methods described above, foreign object detection can be performed with higher accuracy. Specifically, in any of the four methods described above, the processing in a case where it is determined that there is a foreign object may also be executed in a case where there is a suspicion that a foreign object is present. Here, determination of a case where there is a suspicion that a foreign object is present may be performed by providing a new threshold obtained by adding a predetermined margin to the threshold used in determining whether or not there is a foreign object and using the new threshold as a reference. This allows foreign object detection to be performed with higher accuracy. Also, in any of the four methods described above, first, foreign object detection using the power loss method is performed, and then foreign object detection using the waveform attenuation method is performed. The reason for this is as follows. The power loss method can be performed without stopping the TX from transmitting power to the RX. However, to perform the waveform attenuation method, the power transmission from the TX to the RX must be temporarily stopped, leading to a decrease in power transmission efficiency. Thus, by performing foreign object detection using the power loss method first and foreign object detection using the waveform attenuation method after, a decrease in the power transmission efficiency can be minimized or prevented in some cases. However, the same effect can be achieved with any of the four methods described above even when foreign object detection using the waveform attenuation method is performed first and foreign object detection using the power loss method is performed after.

Fifth Embodiment

In the first embodiment, the timing of measuring in advance the waveform attenuation rate in a state with no foreign object, which is necessary for generating the threshold (reference) for foreign object detection using the waveform attenuation method is in any one of the negotiation phase, the calibration phase, or the power transfer phase. In the WPC standard, in the negotiation phase described above, that the phase has advanced to a phase after the negotiation phase in order to perform foreign object detection using the Q-factor measurement method means that the result of the foreign object detection using the Q-factor measurement method corresponds to a determination that there is no foreign object. Thus, if the waveform attenuation rate is measured in any one of the negotiation phase, the calibration phase, of the power transfer phase, there is a high possibility that the waveform attenuation rate in a state with no foreign object can be measured.

However, a foreign object may enter between the power transmitting apparatus and the power receiving apparatus in the time from confirming that there is not foreign object using the Q-factor measurement method in the negotiation phase and measuring the waveform attenuation rate in a state with no foreign object in any one of the negotiation phase, the calibration phase, or the power transfer phase. This would cause the waveform attenuation rate in a state with no foreign object to be unable to be measured accurately. Thus, ideally, it is preferable to confirm that there is no foreign object directly before measuring the waveform attenuation rate in a state with no foreign object. A method for achieving this is described below. In the following description, the power transmitting apparatus 402 (TX) and the power receiving apparatus 401 (RX) will be used as examples.

For example, in a case where the RX detects a change in the state of the TX or the RX and determines that an update or addition is necessary for the threshold used in foreign object detection using the waveform attenuation method (third embodiment), the RX transmits a command to the TX to perform foreign object detection using the power loss method. The TX performs foreign object detection using the power loss method and determines whether or not there is a foreign object. In a case where the determination result is that there is no foreign object, the TX notifies the RX that there is no foreign object, and the RX performs operations for updating or adding the threshold used in foreign object detection using the waveform attenuation method. In other words, as described in the first and second embodiment, the RX transmits to the TX a command requesting for measurement to be performed for setting the threshold for foreign object detection using the waveform attenuation method. Then, the RX controls the load so that the transmission power corresponds to a point desired to be updated or added to the relationship between the transmission power and the waveform attenuation rate. After the TX receives the command, the TX temporarily stops power transmission and measures the waveform attenuation rate of the transmission power waveform. Then, the TX uses the measured waveform attenuation rate, calculates the threshold for foreign object detection using the waveform attenuation method, and sets it as the threshold.

In a case where the RX determines to update or change the threshold of the waveform attenuation method in this manner, directly before performing the operations therefor, the power loss method is used to confirm that there is no foreign object, and then the operations for updating or changing the threshold of the waveform attenuation method are performed. In this manner, when measurement is performed for setting the threshold for foreign object detection using the waveform attenuation method, it can be made so that there is very high probability that there is a state with no foreign object, allowing the foreign object detection threshold to be set more accurately.

In the example described above, the method includes confirming that there is no foreign object using the power loss method directly before performing the operations for updating or changing the threshold of the waveform attenuation method. However, in the power loss method, there is also a threshold for determining whether or not there is a foreign object, and, in a similar manner to the waveform attenuation method, in a case where the state of the TX or the RX changes, the threshold needs to be updated or added. This can be performed in the power transfer phase. Thus, as with the method described above, in a case where the RX determines to update or change the threshold for the power loss method, directly before performing the operations therefor, the waveform attenuation method is used to confirm that there is no foreign object, and then the operations for updating or changing the threshold of the power loss method can be performed. In other words, for example, in a case where the RX detects a change in the state of the TX or the RX and determines that an update or addition is needed for the threshold used in foreign object detection using the power loss method, the RX transmits to the TX a command to perform foreign object detection using the waveform attenuation method. The TX performs foreign object detection using the waveform attenuation method and determines whether or not there is a foreign object. In a case where the determination result is that there is no foreign object, the TX notifies the RX that there is no foreign object, and the RX performs operations for updating or adding the threshold used in foreign object detection using the power loss method. In other words, the RX transmits a command requesting for measurement to be performed for setting the threshold for foreign object detection using the power loss method for updating or adding the threshold used in foreign object detection. Then, the RX controls the load so that the transmission power corresponds to a threshold (point) desired to be updated or added. When the command is received, the TX calculates the threshold for foreign object detection using the power loss method and sets it as the threshold. In this manner, when measurement is performed for setting the threshold for foreign object detection using the power loss method, it can be made so that there is very high probability that there is a state with no foreign object, allowing the foreign object detection threshold to be set more accurately.

Modified Example

The power loss method described in the embodiments described above is an example of a foreign object detection method different from the waveform attenuation method. Instead of the power loss method described above, a different foreign object detection method may be used. For example, the Q-factor measurement method may be used. Methods for measuring the Q-factor include a method including transmitting a resonant frequency signal (for example, a sine wave, a rectangular wave, or the like) and measuring the Q-factor of the resonant frequency. Another method includes transmitting a signal of a plurality of frequencies at or near the resonant frequency a plurality of times and measuring the Q-factor thereof. In another method, a signal (for example, a pulse wave) including a frequency component of all or a portion of the plurality of frequencies for which the electrical characteristic is desired to be measured is transmitted once and calculation processing (for example, Fourier transformation) is executed on the measurement result to measure the Q-factor at the plurality of frequencies. Yet another method includes stopping transmission after transmitting (not power transmission) a predetermined signal and measuring the attenuation state of the attenuating signal. The attenuation state of the signal has correlation with the Q-factor, and thus can be used as a basis for foreign object detection. Alternatively, a method for foreign object detection may be used that uses the measurement results of the resonant frequency of the power transmitting antenna, the steepness of the resonance curve, the inductor value of the power transmitting antenna, the coupling coefficient between the power transmitting antenna and an object placed on the power transmitting apparatus, the electrical characteristic of a power transmitting unit including the power transmitting antenna of the power transmitting apparatus, or the like. Also, these methods may determine whether or not there is a foreign object on the basis of the measurement result of the electrical characteristic at a single frequency or a plurality of frequencies. Also, note that as a method for measuring the electrical characteristic at a plurality of frequencies, a method can be used in which a signal (for example, a sine wave, a rectangular wave, or the like) at each frequency for which the electrical characteristic is desired to be measured is transmitted a plurality of times and the electrical characteristic of the signal at each frequency is measured. This method has the effect of being capable of measurement while giving the power transmitting apparatus a relatively low amount of calculation processing. In another method, a signal (for example, a pulse wave) including a frequency component of all of the plurality of frequencies for which the electrical characteristic is desired to be measured is transmitted once and calculation processing (for example, Fourier transformation) is executed on the measurement result to measure the electrical characteristic at a plurality of frequencies. In another method, a signal including a frequency component of a portion the plurality of frequencies for which the electrical characteristic is desired to be measured is transmitted a plurality of times and calculation processing (for example, Fourier transformation) is executed on the measurement result to measure the electrical characteristic at a plurality of frequencies. This method has the effect of being capable of measuring in a relatively short amount of time due to a decrease in the number of times a signal is transmitted for measurement. Alternatively, a method for foreign object detection may be used that uses the measurement result from a photoelectric sensor installed on the power transmitting apparatus, from an eddy current displacement sensor, from a contact displacement sensor, from an ultrasonic wave sensor, from an image distinction sensor, from a weight sensor, or from other such sensors.

Also, the contents described in the embodiments described above can be combined as appropriate.

According to the present disclosure, a more appropriate foreign object detection technology can be provided.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power transmitting apparatus comprising:
   a coil;
   one or more processors configured to:
      measure a decay of a ringing response;
      obtain Q-factor based on an envelope of the measured decay;
      set a threshold according to the obtained Q-factor; and
      determine whether a foreign object is present based on the set threshold.

2. The power transmitting apparatus according to claim 1, wherein detection processing of the foreign object is performed in a case where there is an instruction to detect a foreign object from a power receiving apparatus.

3. The power transmitting apparatus according to claim 1, wherein processing of the foreign object is performed in a case where there is an instruction to detect a foreign object from a user.

4. The power transmitting apparatus according to claim 1, wherein whether the foreign object is present is determined further based on a power loss method.

5. The power transmitting apparatus according to claim 1, wherein the decay is measured in a state in which a load of a power receiving apparatus is disconnected.

6. The power transmitting apparatus according to claim 1, wherein the threshold is updated in a case where there is an instruction to update a threshold from a power receiving apparatus.

7. The power transmitting apparatus according to claim 1, wherein the decay is a decay of a waveform over time that a voltage is applied to the coil.

8. The power transmitting apparatus according to claim 1, wherein the decay is a decay of a waveform over time that a power transmission current flows in the coil.

9. The power transmitting apparatus according to claim 1, wherein the decay is measured in a period in which power transmission is restricted.

10. The power transmitting apparatus according to claim 9, wherein power transmission is restarted after the threshold is set.

11. The power transmitting apparatus according to claim 9, wherein the power transmission is restricted by incrementally decreasing transmission power for the power transmission.

12. A method for a power transmitting apparatus, the method comprising:
    measuring a decay of a ringing response;
    obtaining Q-factor based on an envelope of the measured decay;
    setting a threshold according to the obtained Q-factor; and determining whether the foreign object is present based on the set threshold.

13. A non-transitory computer-readable storage medium storing a program for causing a computer to execute a method for a power transmitting apparatus, the control method comprising:
measuring a decay of a ringing response;
obtaining Q-factor based on an envelope of the measured decay;
setting a threshold according to the obtained Q-factor; and
determining whether the foreign object is present based on the set threshold.

\* \* \* \* \*